United States Patent
Wu

(10) Patent No.: US 10,904,562 B2
(45) Date of Patent: *Jan. 26, 2021

(54) SYSTEM AND METHOD FOR CONSTRUCTING OPTICAL FLOW FIELDS

(71) Applicant: SZ DJI TECHNOLOGY CO., LTD., Shenzhen (CN)

(72) Inventor: Yannan Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,891

(22) Filed: May 17, 2019

(65) Prior Publication Data
US 2019/0273945 A1 Sep. 5, 2019

Related U.S. Application Data

(63) Continuation of application No. 15/458,522, filed on Mar. 14, 2017, now Pat. No. 10,321,153, which is a
(Continued)

(51) Int. Cl.
*H04N 19/527* (2014.01)
*H04N 19/513* (2014.01)
(Continued)

(52) U.S. Cl.
CPC ......... *H04N 19/527* (2014.11); *H04N 19/521* (2014.11); *H04N 19/172* (2014.11); *H04N 19/182* (2014.11)

(58) Field of Classification Search
CPC .. H04N 19/527; H04N 19/521; H04N 19/172; H04N 19/182
(Continued)

(56) References Cited

U.S. PATENT DOCUMENTS 5,257,209 A 10/1993 Markandey
7,454,038 B1 11/2008 Ruzon
(Continued)

FOREIGN PATENT DOCUMENTS

| CN | 101166276 A | 4/2008 |
| CN | 103913588 A | 7/2014 |

(Continued)

OTHER PUBLICATIONS

The World Intellectual Property Organization (WIPO) International Search Report and Written opinion for PCT/CN2015/085760 dated Apr. 27, 2016 9 Pages.
(Continued)

*Primary Examiner* — Tung T Vo
(74) *Attorney, Agent, or Firm* — Anova Law Group, PLLC

(57) ABSTRACT

A method for constructing an optical flow field includes classifying a plurality of scenarios according to motions of a mobile platform carrying an imaging device and statuses of the imaging device. The plurality of scenarios include at least one of elementary scenarios or combined scenarios. The method further includes constructing a plurality of optical flow fields each corresponding to one of the plurality of scenarios, acquiring a motion of the mobile platform and a status of the imaging device relative to the mobile platform, and selecting a corresponding optical flow field from the constructed optical flow fields corresponding to the plurality of scenarios based upon the motion of the mobile platform and the status of the imaging device for the imaging device to capture a frame at a shooting direction.

20 Claims, 17 Drawing Sheets

Related U.S. Application Data continuation of application No. PCT/CN2015/085760, filed on Jul. 31, 2015.

(51) Int. Cl.
*H04N 19/172* (2014.01)
*H04N 19/182* (2014.01)

(58) Field of Classification Search
USPC .......................................... 348/144
See application file for complete search history.

(56) References Cited

U.S. PATENT DOCUMENTS

| | | |
|---|---|---|
| 7,760,911 B2 | 7/2010 | Xiao et al. |
| 8,031,777 B2 | 10/2011 | Haskell et al. |
| 8,797,417 B2 | 8/2014 | Gayko et al. |
| 2003/0213892 A1 | 11/2003 | Zhao et al. |
| 2006/0177103 A1 | 8/2006 | Hildreth |
| 2008/0187047 A1 | 8/2008 | Stephan et al. |
| 2009/0225300 A1 | 9/2009 | Barrows et al. |
| 2010/0079605 A1 | 4/2010 | Wang et al. |
| 2012/0033896 A1 | 2/2012 | Barrows |
| 2012/0197461 A1 | 8/2012 | Barrows et al. |
| 2013/0301706 A1 | 11/2013 | Qiu et al. |
| 2013/0336387 A1 | 12/2013 | Ono et al. |
| 2017/0180729 A1* | 6/2017 | Wu ...................... H04N 19/172 |
| 2017/0253330 A1* | 9/2017 | Saigh .................... B64C 39/024 |
| 2018/0024547 A1* | 1/2018 | Balachandran ...... G05D 1/0016 701/2 |

FOREIGN PATENT DOCUMENTS

| | | |
|---|---|---|
| CN | 104156932 A | 11/2014 |
| EP | 1921867 A1 | 5/2008 |
| JP | 2005323021 A | 11/2005 |
| JP | 2008104181 A | 5/2008 |
| WO | 2011123758 A1 | 10/2011 |
| WO | 2013169785 A1 | 11/2013 |

OTHER PUBLICATIONS

Angelino, Cesario Vincenzo, Sensor Aided H.264 Video Encoder for UAV Applications, 2013 Picture Coding Symposium, Dec. 8-11, 2013, pp. 173-176, IEEE, San Jose, USA.

Hao Sun and Cheng Wang, Moving Objects Detection for Mobile Mapping, Proceedings of the 2008 IEEE, International Conference on Information and Automation, Jun. 2008, pp. 629-633.

Ryan Kennedy and Camillo J. Taylor, Optical Flow with Geometric Occlusion Estimation and Fusion of Multiple Frames, Medical Image Computing and Computer-Assisted Intervention—MICCAI 2015: 18th International Conference, Oct. 2015, 14 pages, Springer International Publishing.

Nick Barnes and Zhi-Qiang Liu, Embodied Categorisation for Vision-Guided Mobile Robots, Pattern Recognition, Feb. 2004, vol. 37, No. 2, pp. 299-312, Elsevier Ltd.

\* cited by examiner

SYSTEM AND METHOD FOR CONSTRUCTING OPTICAL FLOW FIELDS

CROSS-REFERENCE TO RELATED APPLICATIONS

This application is a continuation of application Ser. No. 15/458,522, filed on Mar. 14, 2017, which is a continuation of International Application No. PCT/CN2015/085760, filed on Jul. 31, 2015, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to video imaging by an imaging device associated with a mobile platform and more particularly to systems and methods for constructing optical flow fields for a selected video frame by determining a motion of the mobile platform and a status of the imaging device.

BACKGROUND

In the technical field of video compression, optical flow fields can be used to demonstrate directions and speeds of motion information on all pixels within a video frame. The information that the optical flow fields provide is very useful for compressing videos or decoding compressed videos since the information can help to reduce efforts needed for searching each pixel of a frame from adjacent frames.

Under traditional technologies, the optical flow fields are generally obtained by estimations through captured still or video images. These approaches involve complex algorithms and are time consuming. Furthermore, such approaches may involve technologies such as texture decompositions, which make it inapplicable to real-time applications, such as aerial video imaging applications.

In view of the foregoing, there is a need for imaging systems and methods that can construct optical flow fields in a rapid and cost-effective manner.

SUMMARY

In accordance with a first aspect disclosed herein, there is set forth a method for constructing an optical flow field, comprising:

acquiring a first motion of a mobile platform having an imaging device;

obtaining a status of the imaging device relative to the mobile platform; and constructing a corresponding optical flow field for a frame based upon the first motion of mobile platform and the status of the imaging device.

In an exemplary embodiment of the disclosed methods, acquiring the first motion comprises determining at least one of a first rotation, a first movement in a horizontal direction and a second movement in a vertical direction of the mobile platform.

In another exemplary embodiment of the disclosed methods, obtaining the status comprises determining at least one of a second motion and a position of the imaging device.

In another exemplary embodiment of the disclosed methods, determining the at least one of the second motion and the position of the imaging device comprises determining at least one of a zooming, a first rotation in a horizontal direction and a second rotation in a vertical direction of the imaging device.

In another exemplary embodiment of the disclosed methods, determining the at least one of the second motion and the position of the imaging device comprises acquiring at least one of an orientation and a tilt angle of the imaging device.

In another exemplary embodiment of the disclosed methods, acquiring comprises acquire the first motion via one or more first sensors disposed on the mobile platform.

In another exemplary embodiment of the disclosed methods, constructing comprises associating a pre-categorized optical flow field with a classified scenario of the first motion of the mobile platform and/or the status of the imaging device.

Exemplary embodiments of the disclosed methods further comprise classifying the scenarios of the mobile platform and the imaging device based on the first motion of the mobile platform and the status of the imaging device.

In another exemplary embodiment of the disclosed methods, classifying the scenarios further comprises defining the scenarios of the first motion of the mobile platform and the status of the imaging device into predefined elementary scenarios.

In another exemplary embodiment of the disclosed methods, the mobile platform is an Unmanned Aerial Vehicle (UAV).

In another exemplary embodiment of the disclosed methods, constructing the corresponding optical flow fields comprises associating a rotating view with a first elementary scenario.

In another exemplary embodiment of the disclosed methods, associating the rotating view comprises associating a predetermined view in which a motion at an outer portion of a frame is significantly faster than a motion at an inner portion of the frame.

In another exemplary embodiment of the disclosed methods, defining the scenarios comprises defining the first elementary scenario as: when the imaging device is shooting in a direction that is orthogonal to a horizontal plane and the UAV is rotating in a plane that is parallel to the horizontal plane.

In another exemplary embodiment of the disclosed methods, constructing the corresponding optical flow fields comprises associating a side moving view with a second elementary scenario.

In another exemplary embodiment of the disclosed methods, associating the side moving view comprises associating a predetermined view in which all objects of the frame are moving along curve paths.

In another exemplary embodiment of the disclosed methods, defining the scenarios comprises defining the second elementary scenario as: when the imaging device is shooting in a direction parallel to a horizontal plane and the UAV or the imaging device is rotating in a plane parallel to the horizontal plane.

In another exemplary embodiment of the disclosed methods, constructing the corresponding optical flow fields comprises associating a zooming-in view with a third elementary scenario.

In another exemplary embodiment of the disclosed methods, associating the zooming-in view comprises associating a predetermined view in which points away from a center of a frame are moving faster than points in the center and getting out of the frame.

In another exemplary embodiment of the disclosed methods, defining the scenarios comprises defining the third elementary scenario as: when the imaging device is shooting in a direction that is orthogonal to the horizontal plane while zooming in or while the UAV is moving toward the ground.

In another exemplary embodiment of the disclosed methods, constructing the corresponding optical flow fields comprises associating a zooming-out view with a fourth elementary scenario.

In another exemplary embodiment of the disclosed methods, associating the zooming-out view comprises associating a predetermined view in which points away from a center of a frame are moving faster than points in the center and getting into the frames.

In another exemplary embodiment of the disclosed methods, defining the scenarios comprises defining the fourth elementary scenario as: when the imaging device is shooting in a direction that is orthogonal to the horizontal plane while zooming out or while the UAV is moving away from the ground.

In another exemplary embodiment of the disclosed methods, constructing the corresponding optical flow fields comprises associating a straight moving view with a fifth elementary scenario.

In another exemplary embodiment of the disclosed methods, associating the straight moving view comprises associating a predetermined view in which the motion is global for all pixels within the frame, but the pixels at an upper portion of the frame are relatively still and the pixels on near-by objects at a lower portion of the frame move relatively faster.

In another exemplary embodiment of the disclosed methods, defining the scenarios comprises defining the fifth elementary scenario as: when the imaging device is shooting at a direction with a certain angle to the horizontal plane and the UAV is moving at a certain speed.

In another exemplary embodiment of the disclosed methods, the UAV is moving in the direction at which the imaging device is shooting.

In another exemplary embodiment of the disclosed methods, associating the straight moving view comprises determining distant objects by depth and/or by locality, and wherein the objects on upper portion of the frame are normally determined as distant objects and objects with similar depths are determined as nearby objects.

In another exemplary embodiment of the disclosed methods, constructing the corresponding optical flow fields comprises associating a global motion view with a sixth elementary view.

In another exemplary embodiment of the disclosed methods, associating the global motion view comprises associating a predetermined view in which the imaging device moves at ultra-fast global constant speed.

In another exemplary embodiment of the disclosed methods, defining the scenarios comprises defining the sixth elementary scenario as: when the UAV is holding still and the camera is rotating in a plane perpendicular to the horizontal plane.

In another exemplary embodiment of the disclosed methods, classifying scenario further comprises combining the predefined elementary scenarios to generate combined scenarios; and combining the corresponding optical flow fields to generate corresponding combined optical flow fields.

In another exemplary embodiment of the disclosed methods, associating the optical flow fields comprises associating the corresponding combined optical flow field with the combined scenario.

In another exemplary embodiment of the disclosed methods, classifying scenarios further comprises defining the scenarios through at least one learning process to generate learned scenarios and defining corresponding learned optical flow fields.

In another exemplary embodiment of the disclosed methods, associating the optical flow fields further comprises associating the corresponding learned optical flow fields at the learned scenarios.

In accordance with a second aspect disclosed herein, there is set forth a method for selecting an optical flow field for a frame, comprising selecting a corresponding optical flow field based on a scenario according to any one of the above described embodiments, wherein the scenario comprises a first motion of a mobile platform and a status of an imaging device coupled with the mobile platform.

In accordance with another aspect disclosed herein, there is set forth an imaging system configured to perform the constructing the optical flow field for a frame in accordance to any one of the above described embodiments.

In accordance with another aspect disclosed herein, there is set forth an imaging system for constructing optical flow fields, comprising:

a mobile platform; and an imaging device associated with the mobile platform, wherein the mobile platform and/or the imaging device is configured to construct the optical flow field for a frame in accordance with any one of the above described embodiments.

In an exemplary embodiment of the disclosed systems, the mobile platform and/or the imaging device includes a processor for constructing the optical flow field for the frame.

In accordance with another aspect disclosed herein, there is set forth a computer program product comprising instructions for selecting the optical flow field for a frame in accordance with any one of the above described embodiments.

In accordance with another aspect disclosed herein, there is set forth a method for constructing an optical flow field, comprising:

acquiring at least one of a first motion of a mobile platform and/or a second motion of a imaging device attached to the mobile platform;

obtaining a position of an imaging device relative to the mobile platform; and constructing a corresponding optical flow field for a frame based upon at least one of the first motion, the second motion and the position.

In an exemplary embodiment of the disclosed methods, acquiring comprises acquiring the at least one of the first motion and the second motion via one or more motion sensors associated with the mobile platform or the imaging device.

In accordance with another aspect disclosed herein, there is set forth an apparatus for constructing an optical flow field, comprising a processor configured for:

acquiring a first motion of a mobile platform having an imaging device;

obtaining a status of the imaging device relative to the mobile platform; and constructing a corresponding optical flow field for a frame, based upon the first motion of mobile platform and the status of the imaging device.

In an exemplary embodiment of the disclosed apparatus, the processor is configured to determine at least one of a first rotation, a first movement in a horizontal direction and a second movement in a vertical direction of the mobile platform.

In an exemplary embodiment of the disclosed apparatus, the processor is configured to determine at least one of a second motion and a position of the imaging device.

In another exemplary embodiment of the disclosed apparatus, the processor is configured to determine at least one of a zooming, a first rotation in a horizontal direction and a second rotation in a vertical direction of the imaging device.

In another exemplary embodiment of the disclosed apparatus, the processor is configured to acquire at least one of an orientation and a tilt angle of the imaging device.

Exemplary embodiments of the disclosed apparatus further comprise one or more first sensors disposed on the mobile platform for acquiring the first motion of the mobile platform.

In another exemplary embodiment of the disclosed apparatus, the processor is configured to associate a pre-categorized optical flow field with a classified scenario of the first motion of the mobile platform and/or the status of the imaging device.

In another exemplary embodiment of the disclosed apparatus, the processor is configured to classify the scenarios of the mobile platform and the imaging device based on the first motion of the mobile platform and the status of the imaging device.

In another exemplary embodiment of the disclosed apparatus, the processor is configured to define the scenarios of the mobile platform and the status of the imaging device into predefined elementary scenarios.

In another exemplary embodiment of the disclosed apparatus, the mobile platform is an Unmanned Aerial Vehicle (UAV).

In another exemplary embodiment of the disclosed apparatus, the processor is configured to associate a rotating view with a first elementary scenario.

In another exemplary embodiment of the disclosed apparatus, the rotating view comprises: a motion at an outer portion of a frame is significantly faster than a motion at an inner portion of the frame.

In another exemplary embodiment of the disclosed apparatus, the first elementary scenario is defined as: when the imaging device is shooting in a direction that is orthogonal to a horizontal plane and the UAV is rotating in a plane that is parallel to the horizontal plane.

In another exemplary embodiment of the disclosed apparatus, the processor is configured to associate a side moving view with a second elementary scenario.

In another exemplary embodiment of the disclosed apparatus, the side moving view comprises: all objects of the frame are moving along curve paths.

In another exemplary embodiment of the disclosed apparatus, the second elementary scenario is defined as: when the imaging device is shooting in a direction parallel to a horizontal plane and the UAV or the imaging device is rotating in a plane parallel to the horizontal plane.

In another exemplary embodiment of the disclosed apparatus, the processor is configured to associate a zooming-in view with a third elementary scenario.

In another exemplary embodiment of the disclosed apparatus, the third elementary scenario is defined as: when the imaging device is shooting in a direction that is orthogonal to the horizontal plane while zooming in or while the UAV is moving toward the ground.

In another exemplary embodiment of the disclosed apparatus, the zooming-in view comprises: points away from a center of a frame are moving faster than points in the center and getting out of the frame.

In another exemplary embodiment of the disclosed apparatus, the processor is configured to associate a zooming-out view with a fourth elementary scenario.

In another exemplary embodiment of the disclosed apparatus, the zooming-out view comprises: points away from a center of a frame are moving faster than points in the center and getting into the frames.

In another exemplary embodiment of the disclosed apparatus, the fourth elementary scenario is defined as: when the imaging device is shooting in a direction that is orthogonal to the horizontal plane while zooming out or while the UAV is moving away from the ground.

In another exemplary embodiment of the disclosed apparatus, the processor is configured to associate a straight moving view with a fifth elementary scenario.

In another exemplary embodiment of the disclosed apparatus, the straight moving view comprises: the motion is global for all pixels within the frame, but the pixels at an upper portion of the frame are relatively still and the pixels on near-by objects at a lower portion of the frame move relatively faster.

In another exemplary embodiment of the disclosed apparatus, the fifth elementary scenario is defined as: when the imaging device is shooting at a direction with a certain angle to the horizontal plane and the UAV is moving at a certain speed.

In another exemplary embodiment of the disclosed apparatus, the UAV is moving in the direction at which the imaging device is shooting.

In another exemplary embodiment of the disclosed apparatus, the processor is configured to determine distant objects by depth and/or by locality for associating the straight moving view, and wherein the objects on upper portion of the frame are normally determined as distant objects and objects with similar depths are determined as nearby objects.

In another exemplary embodiment of the disclosed apparatus, the processor is configured to associate a global motion view with a sixth elementary view.

In another exemplary embodiment of the disclosed apparatus, the global motion view comprises: the imaging device moves at ultra-fast global constant speed.

In another exemplary embodiment of the disclosed apparatus, the sixth elementary scenario is defined as: when the UAV is holding still and the camera is rotating in a plane perpendicular to the horizontal plane.

In another exemplary embodiment of the disclosed apparatus, the processor is configured to combine the predefined elementary scenarios to generate combined scenarios and to combine the corresponding optical flow fields to generate corresponding combined optical flow fields.

In another exemplary embodiment of the disclosed apparatus, the corresponding combined optical flow fields are associated with the combined scenarios.

In another exemplary embodiment of the disclosed apparatus, the processor is configured to define the scenarios through at least one learning process to generate learned scenarios and to define corresponding learned optical flow fields.

Figure 1:
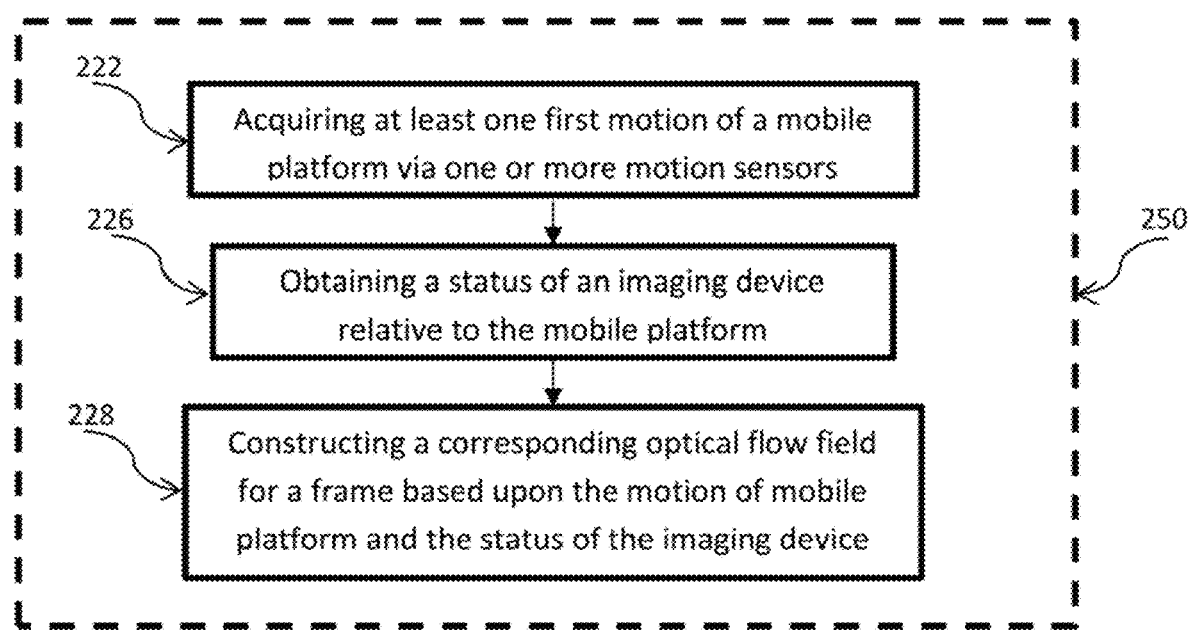
FIG. 1 is an exemplary top level block diagram illustrating an embodiment of an exemplary method for constructing optical flow fields.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION

Since currently-available systems of constructing optical flow fields are complex, expensive, have limited application and incapable of real-time video imaging applications, an optical flow field constructing system and method, that can be selected based on a motion of a mobile platform and a status of an imaging device associated with the mobile platform, can prove desirable and provide a basis for imaging applications, such as aerial video imaging. This result can be achieved, according to one embodiment disclosed in FIG. 1.

Figure 2:
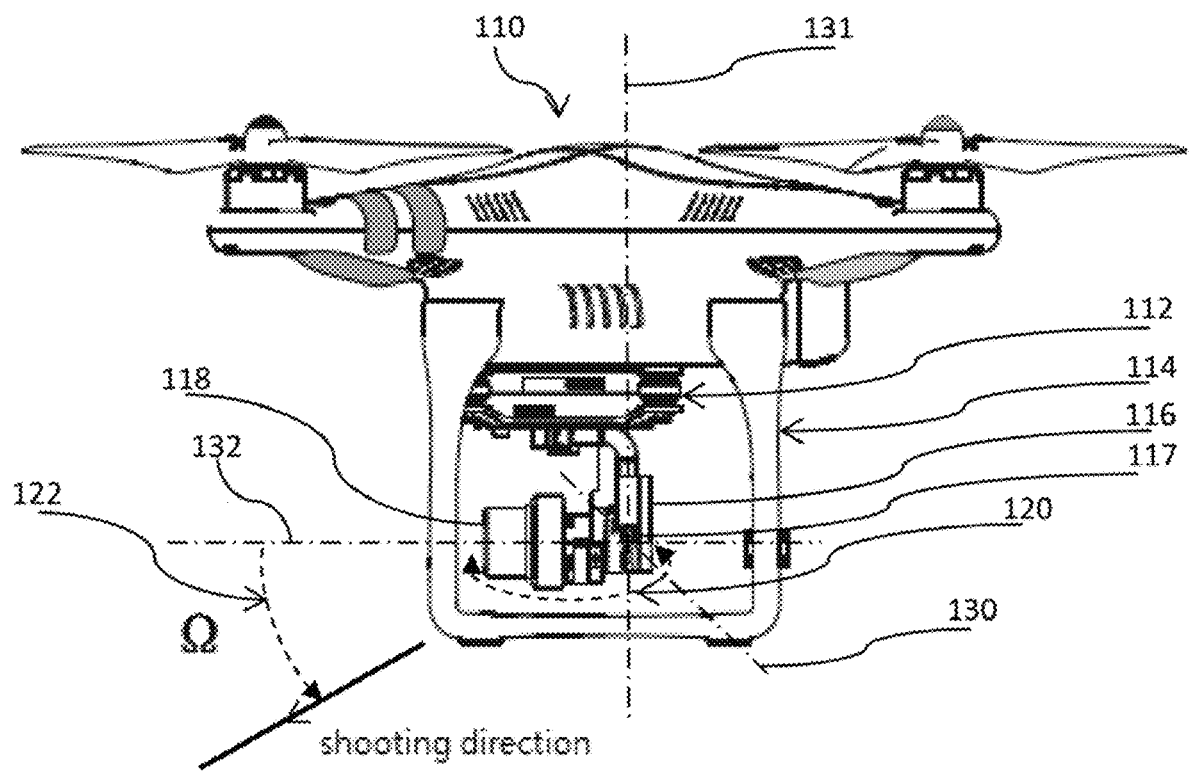
FIG. 2 is an exemplary schematic diagram illustrating an embodiment of an aerial video imaging system implementing the method of FIG. 1, consisting of an imaging device installed on a mobile platform.

FIG. 1 illustrates an exemplary embodiment of a method 200 for constructing an optical flow field based on a first motion of a mobile platform 110 and a status of an imaging device 116 (collectively shown in FIG. 2). As shown in FIG. 1, at 222, a first motion of the mobile platform 110 can be acquired via the mobile platform 110. The first motion can include at least one of a movement and a first rotation of the mobile platform 110 and can be acquired in any suitable manner. One suitable manner for acquiring, at 222, the first motion of the mobile platform 110 includes acquiring the first motion via one or more motion sensors (shown in FIGS. 16 and 17) associated with the mobile platform 110. Detail regarding the first motion will be shown and described with reference to FIG. 2. In some exemplary embodiments, the first motion can be acquired, at 222, via certain sensors that can be already installed on the mobile platform 110 for purposes other than determining the first motion. The sensor parameters will be shown and described in additional detail with reference to FIGS. 2-9.

At 226, a status of an imaging device 116, relative to the mobile platform 110, can be obtained. The status is a relative to the mobile platform 110 and includes a second motion of the imaging device 116 and a relative position of the imaging device 116 relative to the mobile platform 110. The second motion can include a second rotation (or a horizontal rotation) 120 and/or a third rotation (or a vertical rotation) 122 of the imaging device 116. The second motion of the imaging device 116 will be shown and described in additional detail with reference to FIG. 4. The relative position of the imaging device 116 can also comprise a horizontal orientation and/or a tilt angle. The relative position of the imaging device 116 will also be shown and described in detail with reference to FIG. 4.

At 228, a corresponding optical flow field for a selected frame can be constructed based upon the first motion of the mobile platform 110 and/or the status of the imaging device 116. In an exemplary embodiment, the first motion of the mobile platform 110 and/or the status of the imaging device 116 can be categorized into a catalogue of different scenarios. For each scenario, a corresponding optical flow field can be pre-constructed. When a scenario is determined, a corresponding optical flow field can be selected, at 228. Examples of the pre-construction and selection of the optical flow field will be shown and described in detail with reference to FIGS. 11-19.

Although shown and described as constructing a corresponding optical flow field based on the first motion of the mobile platform 110 and the status of the imaging device 116, other suitable information can be used to construct a corresponding optical flow. Such information can include, but is not limited, other motions or status of the mobile platform 110 and/or the imaging device 116.

Referring to FIG. 2, an aerial video imaging system 100 is illustrated as having an imaging device 116. The aerial video imaging system 100 can be a video camera installed on a mobile platform 110, such as an Unmanned Arial Vehicle (UAV). In FIG. 2, the imaging device 116 can be installed via a mounting bracket 112 and a terrace, e.g. a gimbal 117, to the mobile platform 110. The imaging device 116 can be equipped with a lens 118, which can be configured to make a first rotation 120 (or a vertical rotation), about a first axis 130 and a second rotation 122 (or a horizontal rotation), about a second axis 131. The vertical rotation 120 and/or the second rotation 122 can be relative to the mobile platform 110. The first axis 130 and the second axis 131 can be orthogonal to each other, and each of the axes 130, 131 can be orthogonal to a third axis 132 which extends through a center line of the lens 118. Rotation angles for the first and second rotations 120, 122 can include any suitable angle and, in some embodiments, is greater than at least a first threshold angle (not shown).

FIG. 2 shows a status of the imaging device 116, which status can include a position and a second motion of the imaging device 116. In FIG. 2, the position of the imaging device 116 can include, for example, two angles, comprising a horizontal orientation (not shown) and a tilt angle Ω relative to the third axis 132. The horizontal rotation angle can be a result of a horizontal rotation (a second rotation) 120, relative to the second axis 131. The tilt angle Ω can be a result of a vertical rotation (a third rotation) 122, by the imaging device 116 with the tilt angle Ω from the third axis 132. The imaging device 116 can conduct such rotations 120, 122 through the gimbal 117 installed on the mounting bracket 112. In another word, the lens 118 can be configured to make angle rotations horizontally and/or vertically, which rotations 120, 122 can result in a horizon angle and/or a tilt angle Ω of the imaging device 116 relative to the mobile platform 110. Exemplary rotations of the imaging device 116 will be described in additional detail below with reference to FIG. 4.

In FIG. 2, the mobile platform 110 can include a housing 114 for protecting the imaging device 116. The housing 114 advantageously can provide enough space for the imaging device 116 to make the second rotation 120 and/or the third rotation 122 freely. The housing 114 optionally can be transparent to enable the imaging device 116 to capture images through the housing 114. Additionally, the housing 114 can define openings (not shown) through which the imaging device 116 can capture images of a predetermined scene. The housing 114 can be provided in any size, any shape and/or any space as long as images can be captured through its openings and the imaging device 116 is allowed to make free rotations as described with reference to FIGS. 2 and 3.

Although shown and described as a housing shape with reference to FIG. 2 for purposes of illustration only, the housing 114 can be any structural arrangement, including but not limited to brackets, legs, poles and/or any other type of supporting elements.

Figure 3:
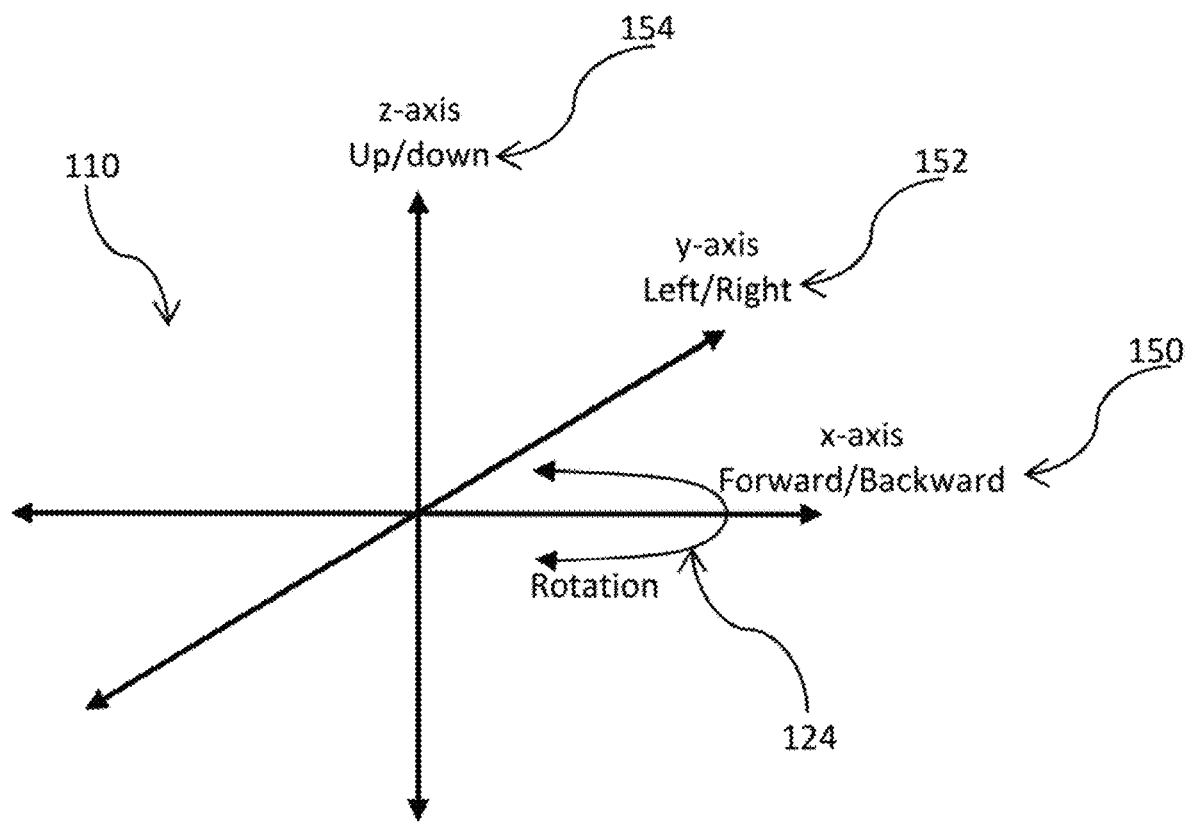
FIG. 3 is an exemplary diagram illustrating an alternative embodiment of the aerial video imaging system of FIG. 2, wherein rotations of the imaging device are illustrated.

FIG. 3 illustrates the first motion of the mobile platform 110 (shown in FIG. 2) relative to an object (not shown), for example, an object on the ground. In FIG. 3, the first motion can comprise movements along up to three axes in up to six directions, namely forward and backward 150 along an x-axis, left and right 152 along a y-axis, and/or up and down along a z-axis 154. The z-axis can either be coaxial with the second axis 131 of FIG. 2 or parallel to the second axis 131. The imaging device 116 (shown in FIG. 2) moves together with the mobile platform 110. Movements in any of the directions 150, 152, 154 of the mobile platform 110 can be performed via any appropriate controller as described in more detail below with reference to FIG. 15.

Alternatively and/or additionally, as shown in FIG. 3, the first motion of the mobile platform 110 can comprise a first rotation 124 about the z-axis in a plane parallel to a horizontal plane (not shown) in addition to the above-mentioned movements 150, 152, 154. When the mobile platform 110 rotates, the imaging device 116 moves along with the mobile platform 110. The mobile platform 110 can be considered in a plane parallel to the horizontal plane when an angle between the plane and the horizon plane is less than ten degrees (10°). Each of the first motions 150, 152, 154, 124 can be measured and/or provided by movement sensors (not shown) associated with the mobile platform 110. Additional detail regarding the first motion of the mobile platform 110 will be shown and described below with reference with FIG. 16. Although shown and described as having three movements 150, 152, 154 and one first rotation 124 with reference to FIG. 3 for purposes of illustration only, the mobile platform 110 can move in any desired manner, and these movements can be measured by the sensors.

Figure 4:
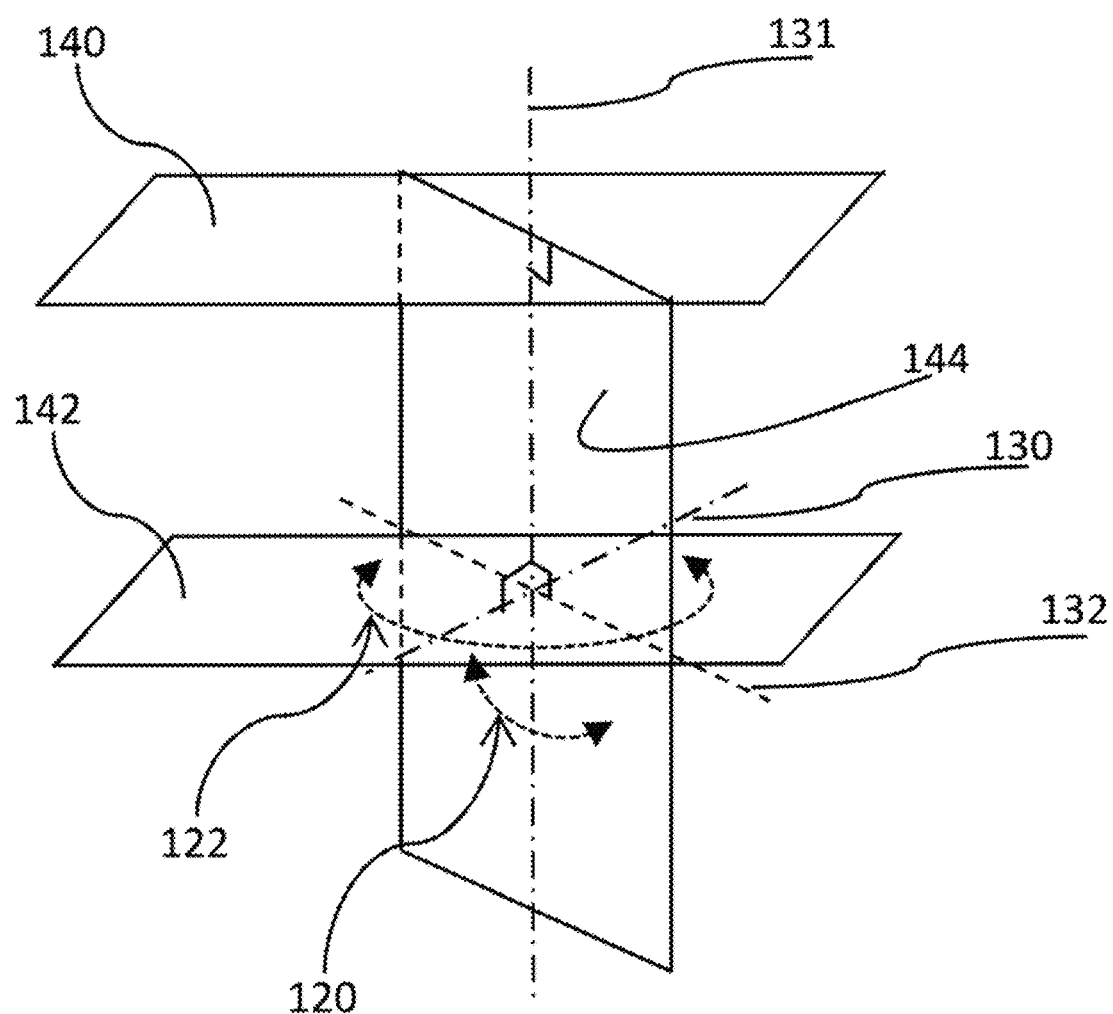
FIG. 4 is an exemplary diagram illustrating another alternative embodiment of the aerial video imaging system of FIG. 2, wherein motions of the mobile platform are illustrated.

FIG. 4 illustrates exemplary plane relationships, a second rotation 120 and a third rotation 122 of the imaging device 116 of FIG. 2. FIG. 4 shows a mobile platform plane 140, a horizontal lens plane 142 that can be parallel to the plane 140 and a vertical plane 144 that can be perpendicular to both of the mobile platform plane 140 and the horizontal lens plane 142. The mobile platform plane 140 can be, for example, a plane defined by propellers of an Unmanned Aerial Vehicle ("UAV"). The horizontal lens plane 142 can be a plane defined by the lens 118 when the lens 118 is shooting at a direction parallel to the mobile platform plane 140. In addition, the first axis 130 (shown in FIG. 2) can extend in the horizontal lens plane 142 and be perpendicular to the vertical plane 144, and the second axis 131 (shown in FIG. 2) can be perpendicular to both the planes 140, 142. The second axis 131 can extend in the vertical plane 144 that can rotate about the second axis 131 as the imaging device 116 (shown in FIG. 2) rotates.

FIG. 4 shows the two rotations, the second rotation 120 and the third rotation 122, of the imaging device 116. As shown in FIG. 4, the second rotation 120 can happen in the vertical plane 144 about the first axis 130, and the third rotation 122 can happen in the horizontal plane 142 about the second axis 131 that can be perpendicular to the first axis 130. In addition, the second rotation 120 can be at least at a first threshold angle (not shown), and the third rotation 122 can be at least at a second threshold angle (not shown).

As shown and described above with reference to FIG. 2, the second and third rotations 120, 122 can be performed via the gimbal 117, which can be part of the mounting bracket 112 associated with the mobile platform 110. In some embodiment, the gimbal 117 can controllably rotate about two the axes 130, 131. Both the second and third rotations 120, 122 of the gimbal 117 can be measured and provided by motion sensors (shown in FIG. 17) associated with the gimbal 117 and/or the imaging device 116. Although shown and described as having only two rotations 120, 122, the imaging device 116 can perform other actions (not shown), including but not limited to zooming in and zooming out. One or more sensors can measure these actions and provide measurement data to the system 100.

In addition, the status of the imaging device 116 can comprise two positions as shown and described with reference to FIG. 2. The imaging device 116 can be considered as shooting horizontally when its center line 132 is in a direction within an angle of ten degrees) (±10° relative to the horizontal lens plane 142, and the imaging device 116 can be considered as shooting toward the ground when its center line 132 is in a direction within an angle greater than eighty degrees (80°) and less than one hundred degrees (100°) relative to the horizontal lens plane 142.

The first motion of the mobile platform 110 and the status of the imaging device 116 of the FIGS. 3 and 4 can be categorized into a catalogue of different scenarios based on data acquired via related sensor parameters.

Figure 5:
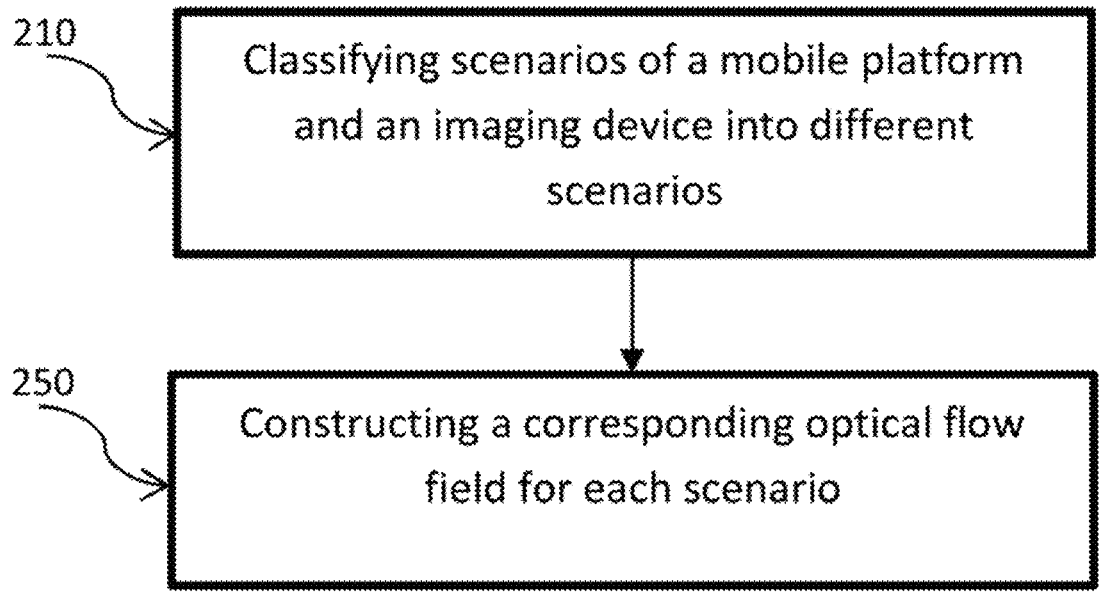
FIG. 5 is an exemplary block diagram, illustrating an embodiment of the method of FIG. 1, wherein the method includes constructing corresponding optical flow fields.

FIG. 5 shows the method 200 as including classifying scenarios of the mobile platform 110 and the imaging device 116 (collectively shown in FIG. 2), at 210, before constructing the corresponding optical flow fields, at 250. At 210, the scenarios can be classified into categories as shown and described in FIGS. 7 and 8. The classifications can be carried out based on a first motion of the mobile platform 110 and a status of the imaging device 116. According to the classified scenarios, a corresponding optical flow field can be constructed and associated with each scenario, at 250.

Although shown and described as classifying the scenarios of the mobile platform 110 and the imaging device 116 before constructing the corresponding optical flow field for each scenario, the optical flow field can also be constructed before classifying the scenarios of the mobile platform 110 and the imaging device 116. In a latter case, the optical flow fields can be constructed based on characteristics of each optical flow field before figuring out the scenario of the mobile platform 110 and the imaging device 116 for the optical flow field.

Figure 6:
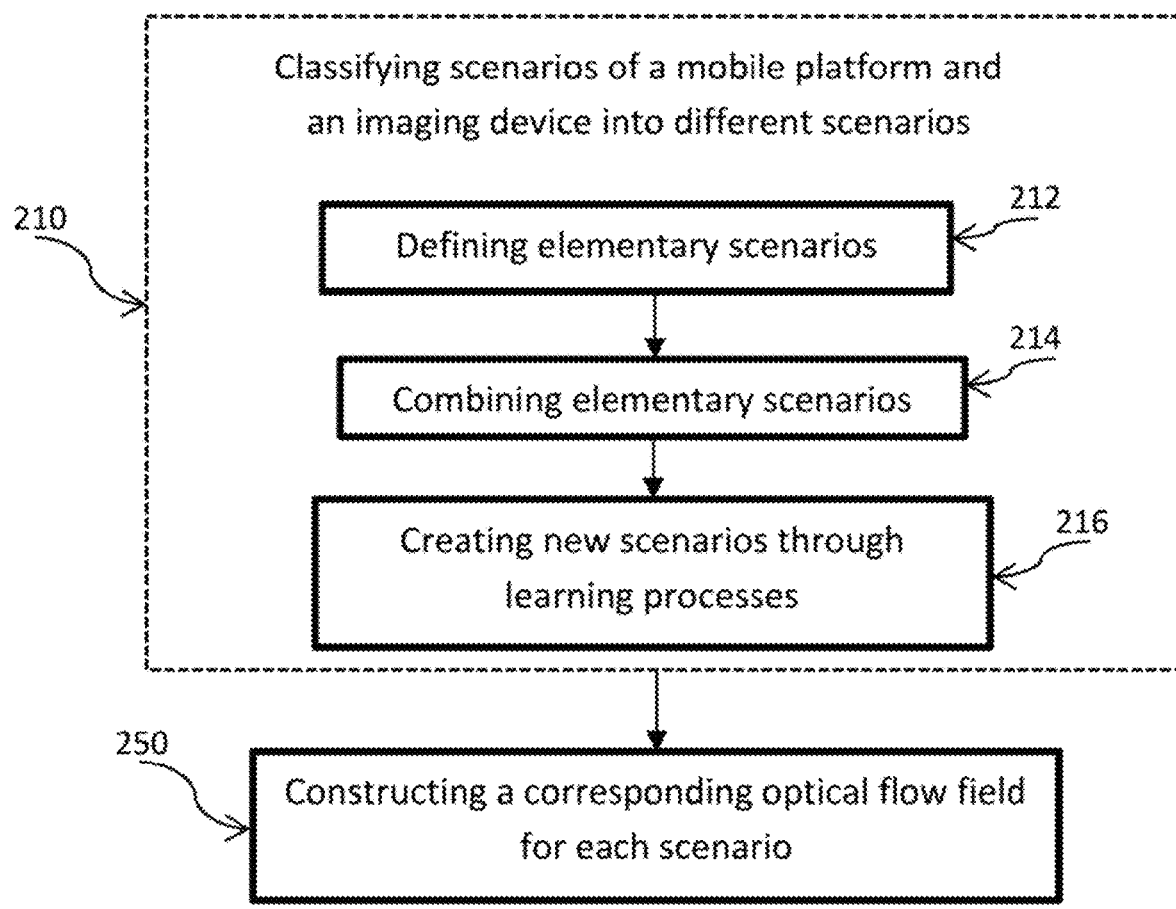
FIG. 6 is an exemplary block diagram, illustrating an alternative embodiment of the method of FIG. 5, wherein the method includes approaches of constructing different categories of scenarios of sensor parameters.

FIG. 6 shows another alternative embodiment of the method 200, wherein three approaches of classifying scenarios of the mobile platform 110 and the imaging device 116 (collectively shown in FIG. 2) at 210 are illustrated. In FIG. 6, a plurality of scenarios of the mobile platform 110 and the imaging device 116 can be defined, at 212. The scenarios can be predefined elementary scenarios reflecting the first motion of the mobile platform 110 and/or the status the imaging device 116.

As described above with reference to FIGS. 3 and 4, the scenarios reflect the first motion of the mobile platform 110 and/or the status of the imaging device 116. Sensors (not shown), associated with the mobile platform 110 and/or the imaging device 116, measure the first motion and the status, including the movements and rotations 120, 122, 150, 152, 154, 124 of the mobile platform 110 and/or the imaging device 116. In some predefined elementary scenarios, the first motion and/or status can be commonly seen in real-life operations, and the corresponding optical flow fields can be pre-defined, at 212.

At 214, another approach of classifying the scenarios can include combining the two or more predefined elementary scenarios. The predefined elementary scenarios can be combined to generate one or more combined scenario categories. When combining the predefined elementary scenarios, vector operations can be applied against the combination of the corresponding optical flow fields. For example, vector superposition can be applied when combining two predefined elementary scenarios.

At 216, new categories of scenarios can be created through learning processes. Newly-created categories can be included in the scenarios stored in storage, such as a memory 290 (shown in FIG. 16). The storage can be a database or any type of data storage structure. The learning process can include a manual process and/or an automatic process. If a manual process is introduced, a recording system can be utilized to enable manual selection and creation of learned scenarios. In addition, the newly selected and/or created learned scenarios can associate with corresponding optical flow fields, at 216.

Although shown and described as classifying the scenarios in three approaches in an order of 212, 214 and 216 for purposes of illustration only, other suitable approaches and/or other orders can be applied in classifying the scenarios.

Figure 7:
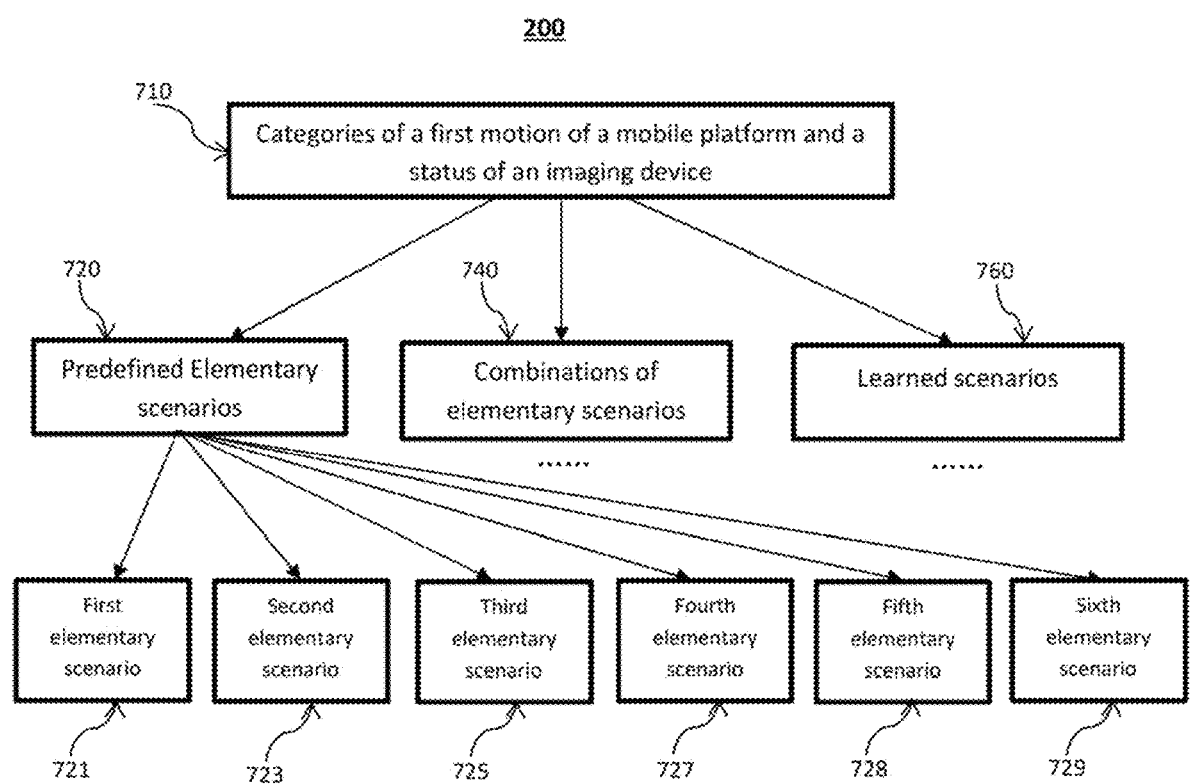
FIG. 7 is an exemplary block diagram, illustrating an alternative embodiment of the method of FIG. 7, wherein the scenario categories are illustrated.

FIG. 7 illustrates an exemplary structure of the classified scenarios of FIG. 6, where the scenarios can be classified into three categories: a predefined elementary scenario 720; a combined elementary scenario 740 and a learned scenario 760. Six predefined elementary scenarios of the mobile platform 110 and the imaging device 116 can be contained as shown in FIG. 7, including a first elementary scenario 721, a second elementary scenario 723, a third elementary scenario 725, a fourth elementary scenario 727, a fifth elementary scenario 728 and a sixth elementary scenario 729.

In FIG. 7, the first elementary scenario 721 can be defined as when the mobile platform 110 is rotating in a plane that is parallel to the horizontal plane and the imaging device 116 is shooting in a direction that is orthogonal to a horizontal plane. The second elementary scenario 723 can be defined as when the imaging device 116 is shooting in a direction parallel to a horizontal plane and the mobile platform 110 or the imaging device 116 is rotating in a plane parallel to the horizontal plane. The third elementary scenario 725 can be defined as when the imaging device 116 is shooting in a direction that is orthogonal to the horizontal plane while zooming in or while the mobile platform 110 is moving toward the ground. The fourth elementary scenario 727 can be defined as when the imaging device 116 is shooting in a direction that is orthogonal to the horizontal plane while zooming out or while the mobile platform 110 is moving away from the ground. The fifth elementary scenario 728 can be defined as when the imaging device 116 is shooting at a direction with a certain angle to the horizontal plane and the mobile platform 110 is moving at a certain speed. The sixth elementary scenario 729 can be defined as when the mobile platform 110 is holding still and the imaging device 116 is rotating in a plane perpendicular to the horizontal plane.

In FIG. 7, combinations of the predefined elementary scenarios 720 are illustrated at 740. A combined scenario can consist of any combination of two or more of the predefined elementary scenarios 720. A combined scenario can also contain one or more combined scenarios 740 and/or one or more learned scenarios 760.

FIG. 7 also illustrates a category of learned scenarios 760, which can be any scenario learned during a course of operations as described with reference to FIG. 6. A learned scenario can be included in a working set immediately and/or at a predetermined later time.

Although shown and described as including three categories of scenarios and six predefined elementary scenarios 720 with reference to FIG. 7 for purposes of illustration only, any suitable number of scenario categories and/or predefined elementary scenarios 720 of sensor parameters can be included as desired.

Figure 8:
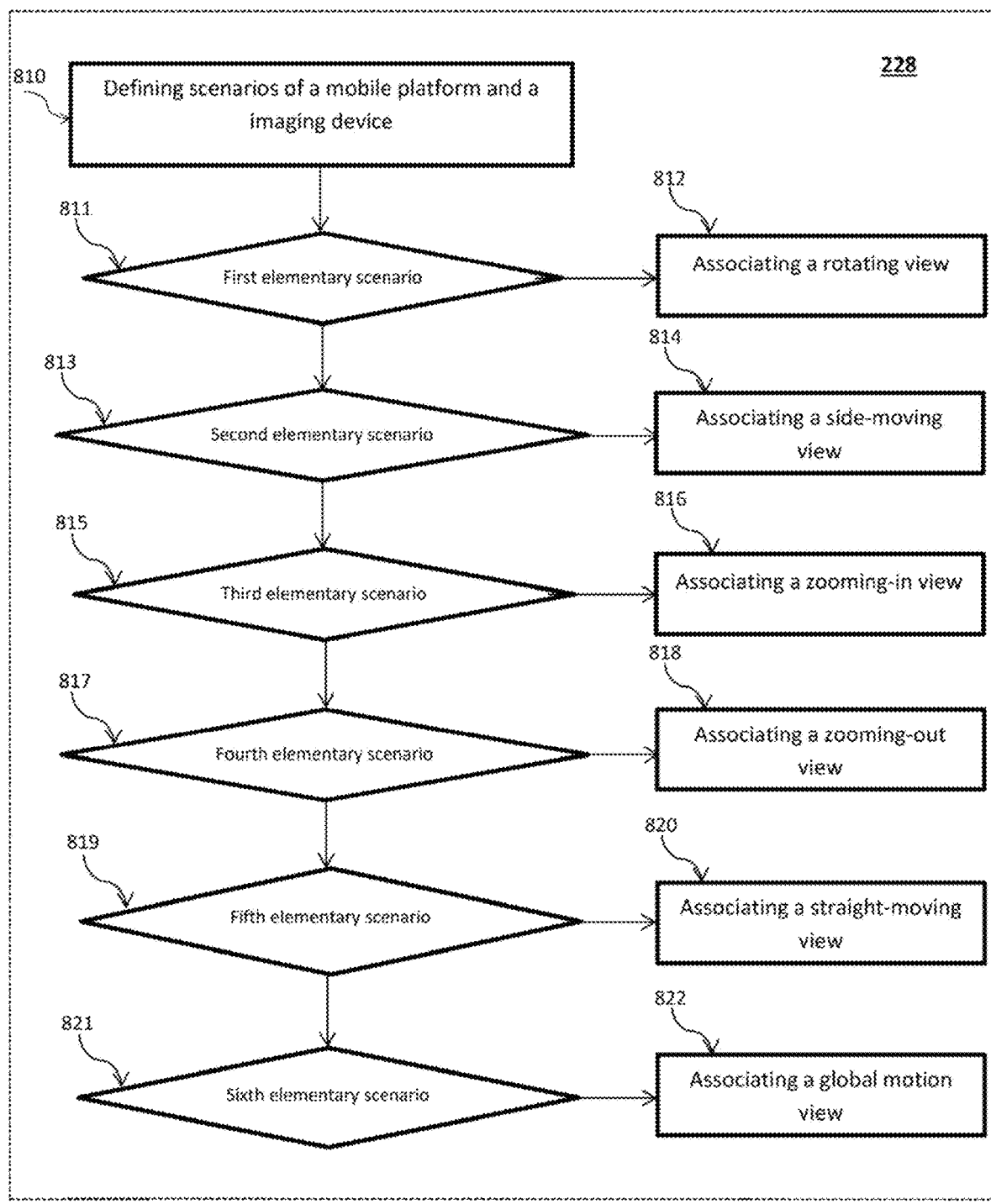
FIG. 8 is an exemplary block diagram, illustrating an alternative embodiment of the method of FIG. 5, wherein the method associates corresponding views of the optical flow fields in accordance with the scenario categories.

FIG. 8 illustrates an alternative embodiment of the method 200. Turning to FIG. 8, one manner for constructing the corresponding optical flow fields is illustrated, at 228. At 810, the elementary scenarios 720 (shown in FIG. 7) of the mobile platform 110 and the imaging device 116 can be defined. A corresponding view of the optical flow field can be associated with each of the predefined elementary scenarios 720.

At 811, for a first elementary scenario, a corresponding rotating view is associated at 812, which view will be described in additional detail below with reference to FIG. 10. As described with reference to FIG. 7, in this scenario, the imaging device 116 is shooting in a direction that is orthogonal to a horizontal plane and the mobile platform 110 is rotating in a plane that is parallel to the horizontal plane.

At 813, for a second elementary scenario, a corresponding side-moving view is associated at 814, which view will be described in additional detail below with reference to FIG. 11. As described with reference to FIG. 7, in this scenario, the imaging device 116 is shooting in a direction parallel to a horizontal plane and the mobile platform 110 and/or the imaging device 116 is rotating in a plane parallel to the horizontal plane.

At 815, for a third elementary scenario, a corresponding zooming-in view is associated at 816, which view will be described in additional detail below with reference to FIG. 12. As described with reference to FIG. 7, in this scenario, the imaging device 116 is shooting in a direction that is orthogonal to the horizontal plane while zooming in or while the mobile platform 110 is moving toward the ground.

At 817, for a fourth elementary scenario, corresponding zooming-out view at 818, which view will be described in additional detail below with reference to FIG. 12. As described with reference to FIG. 7, in this scenario, the imaging device 116 is shooting in a direction that is orthogonal to the horizontal plane while zooming out or while the mobile platform 110 is moving away from the ground.

At 819, for a fifth elementary scenario, a corresponding straight-moving view is associated at 820, which view will be described in additional detail below with reference to FIG. 13. As described with reference to FIG. 7, in this scenario, the imaging device 116 is shooting at a direction with a certain angle to the horizontal plane and the mobile platform 110 is moving at a certain speed.

At 821, for a sixth elementary scenario, a corresponding global motion view is associated at 822, which view will be described in additional detail below with reference to FIG. 14. As described with reference to FIG. 7, in this scenario, the mobile platform 110 is holding still and the imaging device 116 is rotating in a plane perpendicular to the horizontal plane.

Figure 9:
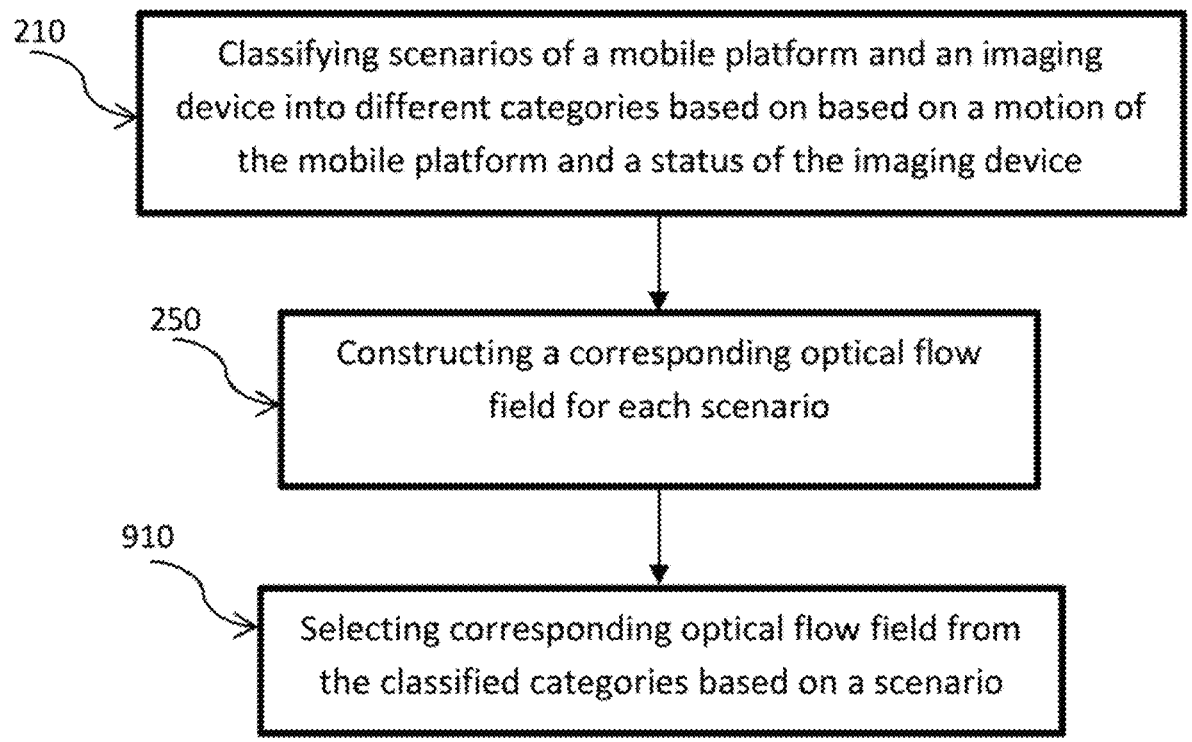
FIG. 9 is an exemplary block diagram, illustrating an alternative embodiment of the method of FIG. 8, wherein the method includes selecting the corresponding optical flow fields.

FIG. 9 shows an exemplary embodiment of the method 200 of FIG. 5. In FIG. 9, an additional procedure 910 is introduced into the process of the method 200. At 910, a corresponding optical flow field is selected and returned based on a scenario of sensor parameters. As described with reference to FIG. 7, the clarified scenarios include the predefined elementary scenarios, the combined elementary scenarios and the learned scenarios. As exemplary examples, the corresponding relationships for the predefined elementary are described with reference to FIG. 8.

At 910, when a categorized scenario is determined, an optical flow field associated with the scenario can be selected for purposes of image processing, such as video compression.

Figure 10:
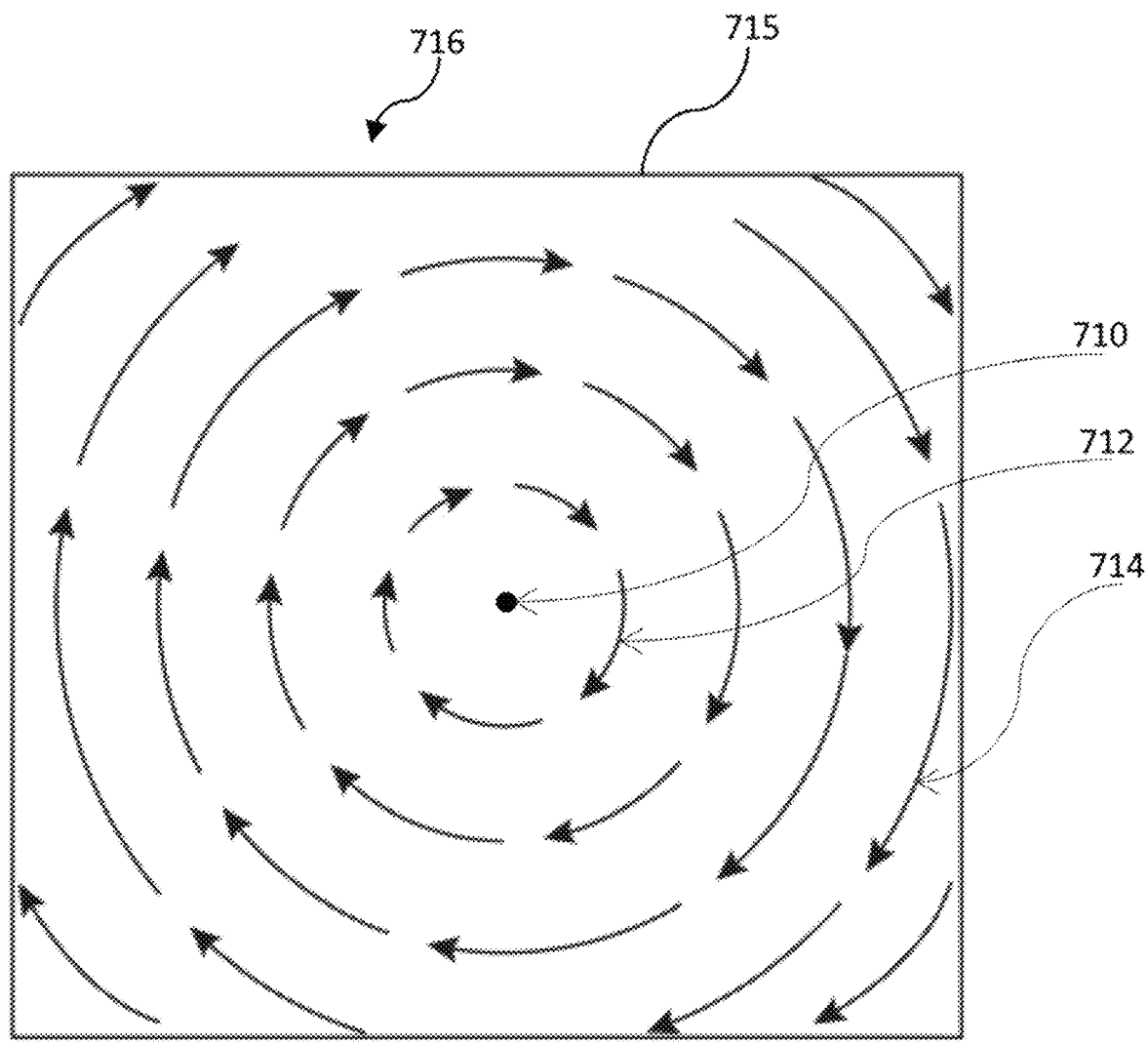
FIG. 10 is an exemplary frame diagram, illustrating an embodiment of a rotating view of the first elementary scenario of sensor parameters of FIG. 7.

Referring now to FIG. 10, an embodiment of a rotating view 716 of a frame 715 as a first elementary scenario 811 of FIG. 8 is illustrated with a corresponding optical flow field. As described with reference to FIG. 8, the first predefined elementary scenario 811 consists of two conditions: first, a first motion of the mobile platform 110 (shown in FIG. 2) consists of rotating in a plane that is parallel to the horizontal plane as described with reference to FIGS. 3, 4, 7 and, 8, and second, a status of the imaging device 116 (shown in FIG. 2) consists of a position of shooting in a direction that is orthogonal to a horizontal plane. When the two conditions for the first predefined elementary scenario 811 are met, the method 200 (shown in FIG. 9) can select the corresponding rotating view 716 of FIG. 10. In the rotating view 716, all vectors in a frame can be circulating about a center point 710, where the pixels at an outer portion, e.g. 714, can be moving much faster than the pixels at an inner portion of the frame 715, e.g. 712.

As shown in FIG. 10, the pixels in the outmost portions, e.g. a portion 714, in the rotating view 716, move the fastest about the center 710 and pixels in the innermost portion, e.g. a portion 712, move much slower. Moving speeds of pixels in other portions depend on the distances of a pixel to the center 710.

Figure 11:
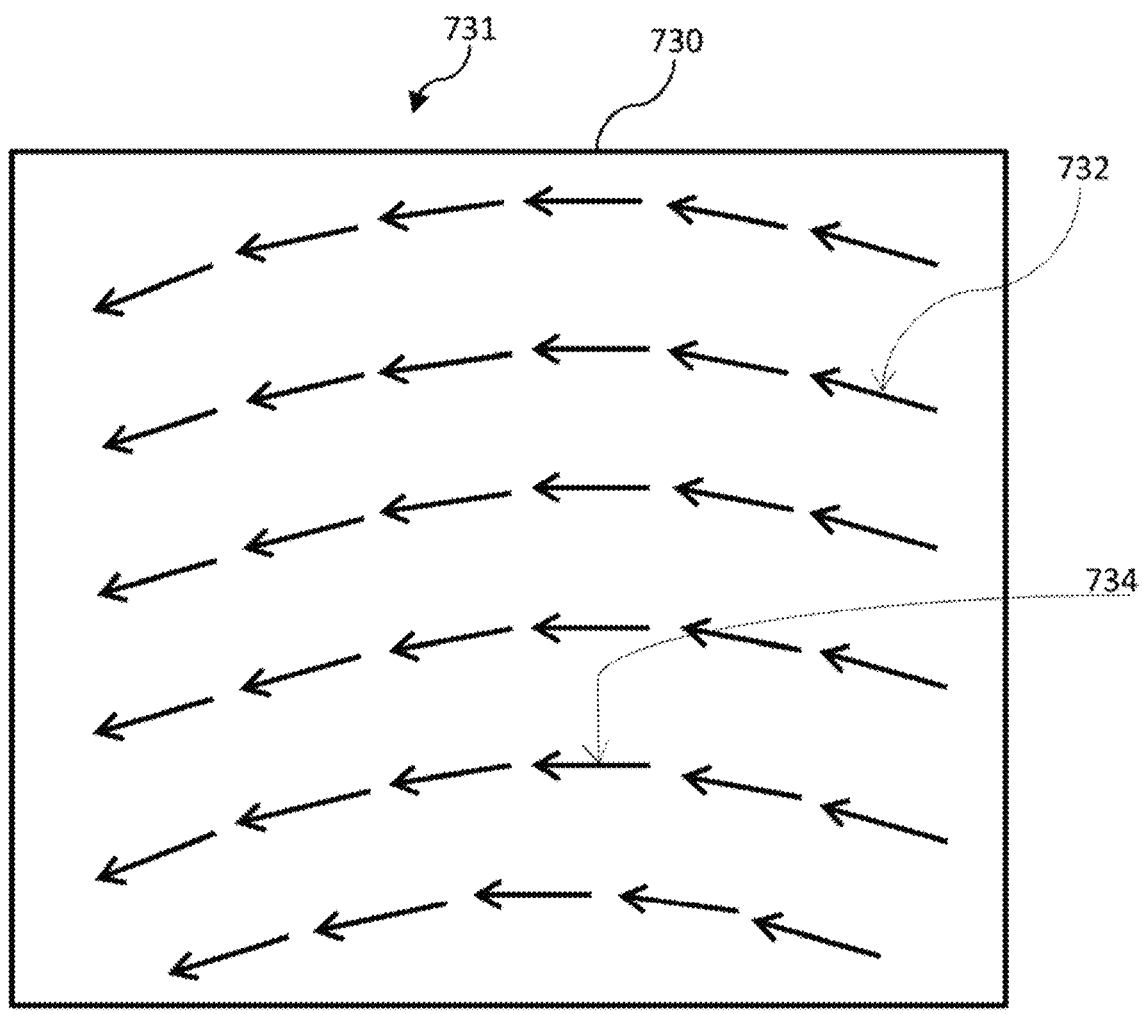
FIG. 11 is an exemplary frame diagram, illustrating an embodiment of a side-moving view of the second elementary scenario of sensor parameters of FIG. 7.

Referring to FIG. 11, an embodiment of a side-moving view 731 of a frame 730 as a second predefined elementary scenario 813 of FIG. 8 is illustrated with a corresponding optical flow field. As described with reference to FIG. 8, the second predefined elementary scenario 813 can consist of two conditions: first, a first motion of the mobile platform 110 or a second motion of the imaging device 116 (collectively show in FIG. 2) consists of rotating in a plane parallel to the horizontal plane as described with reference to FIGS. 3, 4, 7 and 8, and second, the position of the imaging device 116 consists of shooting in a direction parallel to a horizontal plane. When the two conditions for the second predefined elementary scenario 813 are met, the method 200 (shown in FIG. 9) can select a corresponding side-moving view 731. In the side-moving view 731, all vectors, e.g. 732 and 734, in the frame 730 can be moving following curve paths. The vectors representing pixel movements of the frame 730 can be consistent throughout the frame 730.

As shown in FIG. 11, the pixels in the frame 730 can be considered identical or similar in direction and magnitude within any one portion of the frame 730. Between any two portions of the frame 730, the vectors can be identical or similar in magnitude but different in direction.

Figure 12:
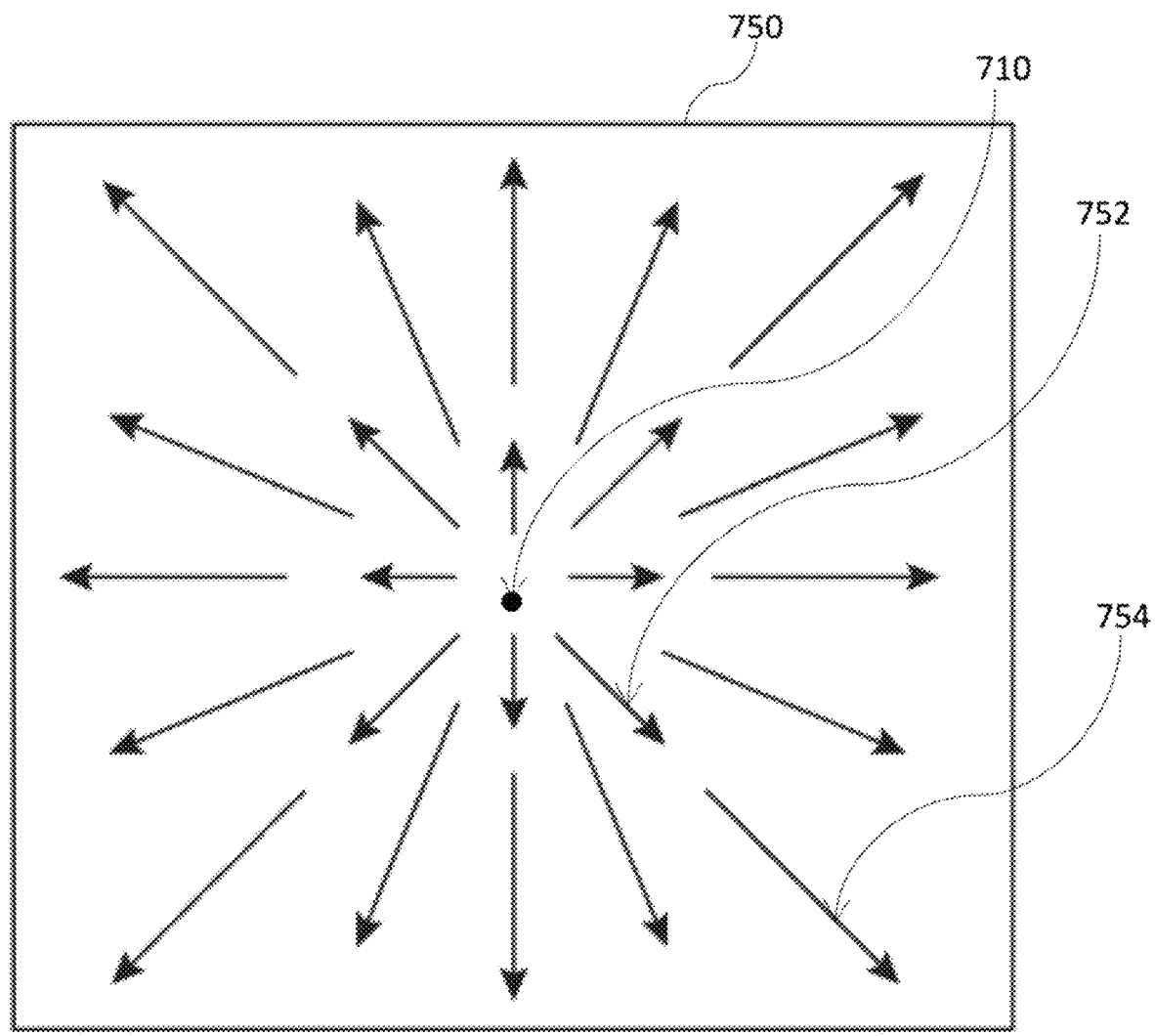
FIG. 12 is an exemplary frame diagram, illustrating an embodiment of a zooming-in view of the third elementary scenario of the sensor parameters of FIG. 7.

Referring now to FIG. 12, an embodiment of a zooming-in view 751 of a frame 750 as a third predefined elementary scenario 815 of FIG. 8 is illustrated with a corresponding optical flow field. As described with reference to FIG. 8, the third predefined elementary scenario 815 consists of two conditions: first, a position of the imaging device 116 consists of shooting in a direction that is orthogonal to the horizontal plane, and second, a second motion of the imaging device 116 consists of zooming-in or a first motion of the mobile platform 110 consists of moving toward the ground as described with reference to FIGS. 3, 4, 7 and 8. When the two conditions for the third predefined elementary scenario 815 are met, the method 200 (shown in FIG. 9) can select the corresponding zooming-in view 751 of FIG. 12. In the zooming-in view 751, pixels distant from the center point 710 can be moving faster that those pixels closer to the center point 710. All pixels in the frame 750 can be radiating outwards.

With little variation from FIG. 12, an embodiment of a zooming-out view 753 (not shown) of a frame 750 as a fourth predefined elementary scenario 817 of FIG. 8 can be illustrated with a corresponding optical flow field. As described with reference to FIG. 8, the fourth predefined elementary scenario 817 consists of two conditions: first, a position of the imaging device 116 consists of shooting in a direction that is orthogonal to the horizontal plane, and second, a second motion of the imaging device 116 consists of zooming-out or a first motion of the mobile platform 110 consists of moving away from the ground as described with reference to FIGS. 3, 4, 7 and 8. Like the zooming-in view 751, in zooming-out view 751, pixels distant from the center point 710 can be moving faster that those pixels closer to the center point 710. Unlike the zooming-in view 751, in zooming-out view 753, pixels in the frame 750 come from outside of the frame 750 and can be radiating inwards.

As shown in FIG. 12, the pixels in an outer portion, e.g. 754 move the fastest about the center 710 and pixels in the inner portion, e.g. 752 move much slower. Moving speeds of a pixel in the zooming-in view 751 depend on the distances of the pixel to the center 710. When the imaging device 116 is zooming-in, the pixels enter the frame 750 from the center point 710 and move from an innermost portion outward to the outer portions and out of the frame 750. When the imaging device 116 is zooming-out, the pixels enter the frame 750 from the outbound to the outmost portion and to the inner portions, disappear at the center point 710.

Figure 13:
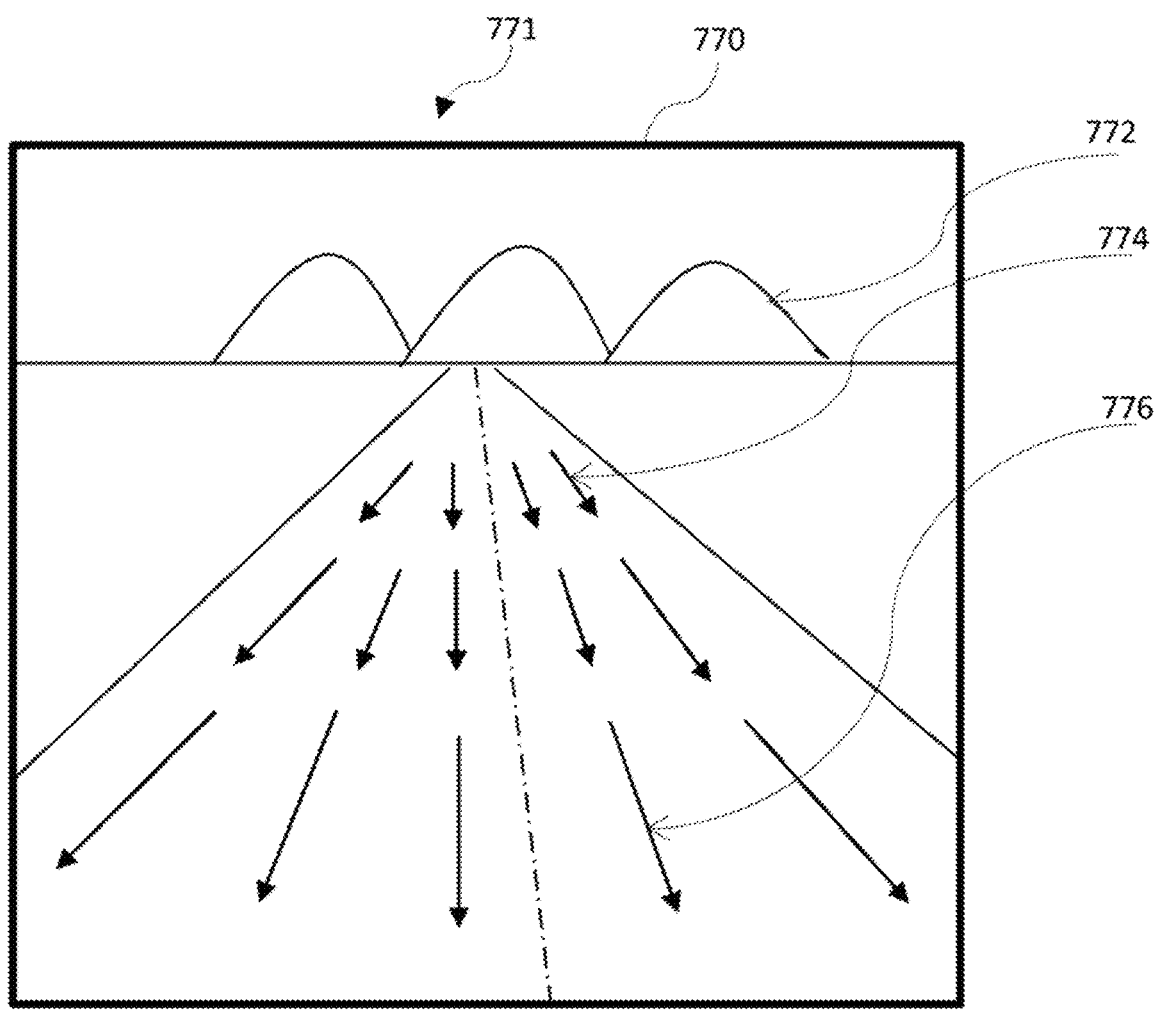
FIG. 13 is an exemplary frame diagram, illustrating an embodiment of a straight-moving view of the fifth elementary scenario of sensor parameters of FIG. 7.

Referring now to FIG. 13, an embodiment of a straight-moving view 771 of a frame 770 as a fifth predefined elementary scenario 819 of FIG. 8 is illustrated with a corresponding optical flow field. As described with reference to FIG. 8, the fifth predefined elementary scenario 819 consists of two conditions: first, a position of the imaging device 116 consists of shooting at a direction with a certain angle Ω to the horizontal plane, and second, a second motion of the mobile platform 110 consists of moving at a certain speed as described with reference to FIGS. 3, 4, 7 and 8. When the two conditions for the fifth predefined elementary scenario 819 are met, the method 200 (shown in FIG. 10) can select the corresponding straight-moving view 771 of FIG. 13.

In the straight-moving view 771, pixels at the upper portion of a frame 770, representing certain far distant objects, can be relatively still and pixels at the lower portion of the frame 770, representing closer views or objects, can be moving relatively fast as shown in FIG. 13. In addition, this scenario represents a view when the mobile platform 110 is flying away.

As shown in FIG. 13, in the straight-moving view 771, pixels in the upper portion can be almost still because they represent distant objects, and the pixels of the lower portion in the lower portion can move much faster than the pixels of the upper portion. The pixels in the lower portion can be moving from the upper portion to the lower portion of the frame at angles and move out of the frame 770 as shown in FIG. 13.

Figure 14:
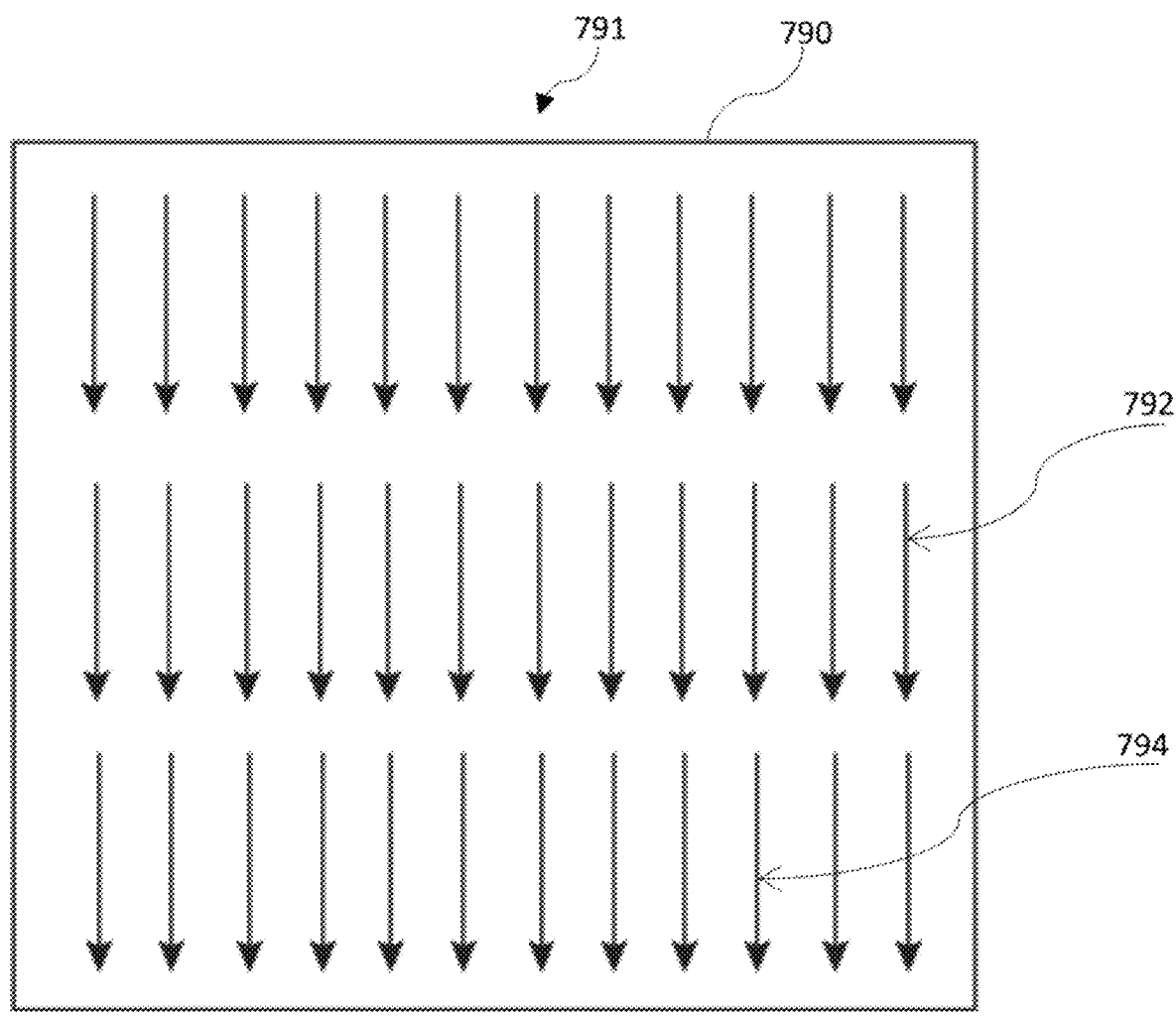
FIG. 14 is an exemplary frame diagram, illustrating an embodiment of a global motion view of the sixth elementary scenario of sensor parameters of FIG. 7.

Referring to FIG. 14, an embodiment of a global motion view 791 of a frame 790 as a sixth predefined elementary scenario 821 is illustrated as a corresponding optical flow field. As described with reference to FIG. 8, the sixth predefined elementary scenario 821 consists of two conditions: first, a first motion of the mobile platform 110 consists of holding still, and second, a second motion of the imaging device 116 consists of rotating in a plane perpendicular to the horizontal plane, which is greater than a first threshold as described with reference to FIGS. 3, 4, 7 and 8. When the two conditions for the sixth predefined elementary scenario 821 are met, the method 200 (shown in FIG. 10) selects a corresponding global motion view 791 of FIG. 14. In the global motion view 791, pixels in the frame 790 can be moving globally in one direction, e.g. from the upper portion of the frame to the lower portion of the frame at motions represented by speed vectors, e.g. 792 and 794, and out of the frame from the lower portion of the frame 790.

In this scenario 821, all vectors have identical or similar directions and magnitudes, e.g. vectors 792 and 794. Therefore, the pixels of the frame 790 can be regarded having a global motion across the frame 790.

Figure 15:
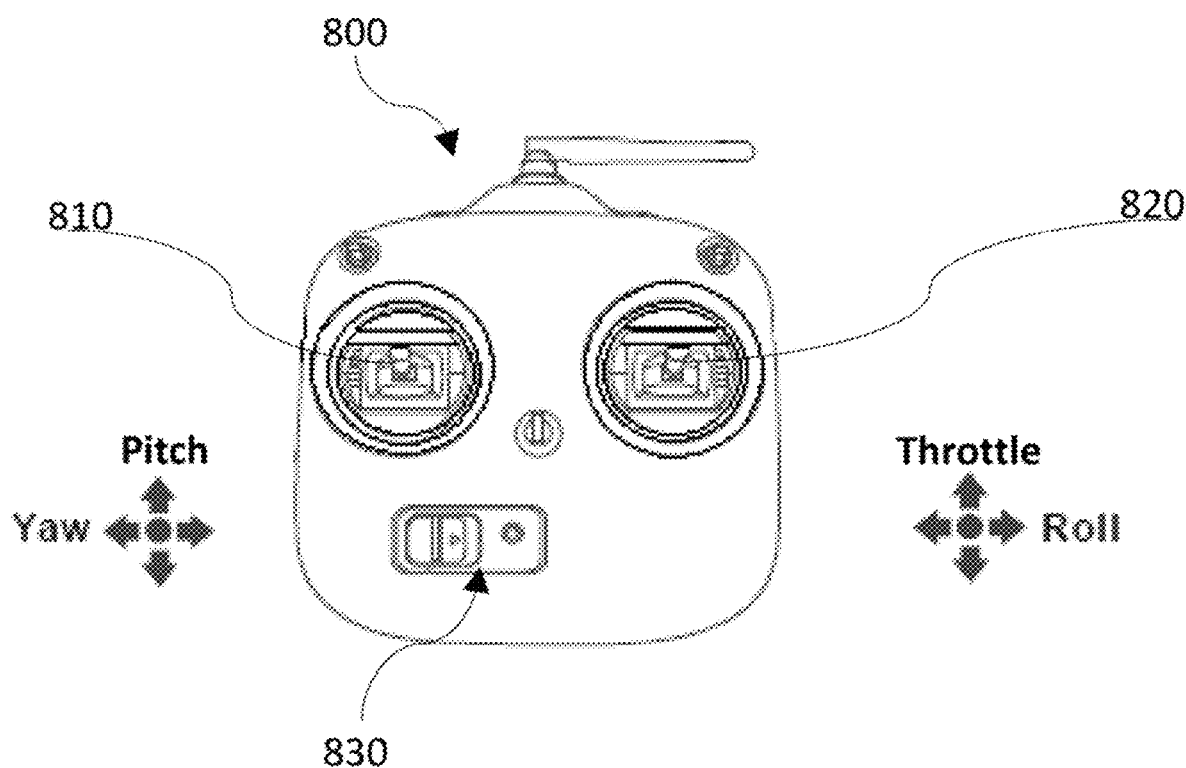
FIG. 15 is an exemplary layout diagram, illustrating an embodiment of a control console of the aerial video imaging system of FIG. 2.

FIG. 15 illustrates an exemplary control console 800 that performs the movements of the UAV 110 (shown in FIG. 2). As shown in FIG. 15, the console 800 can consist of one or more joysticks 810, 820 and a power switch 830. The joysticks 810, 820 control the UAV 110 to perform the movements through pitch, yaw, throttle and/or roll actions as indicated in FIG. 15. Additionally and/or alternatively, the console 800 can have another set of controls (not shown in FIG. 15) that conduct the actions of the imaging device 116 (shown in FIG. 2), or the imaging device 116 can be controlled with a separate control console (not shown). The separate control console, for example, can be a mobile app running on a mobile phone.

The control console 800 can be of any type, including game consoles like the one shown in FIG. 15, remote controllers and any apps running on computers, mobile phones, tablets and any other mobile platforms that can perform control functions controlling functions over the UAV 110 and/or the imaging device 116.

Figure 16:
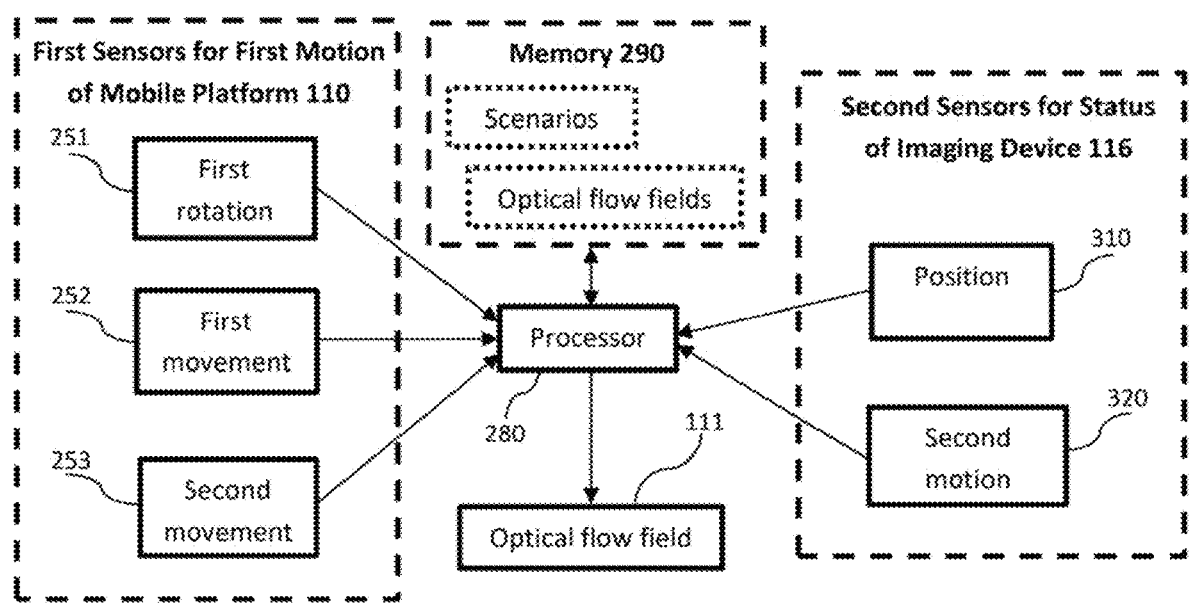
FIG. 16 is an exemplary block diagram of an embodiment of an imaging system, wherein the method of FIG. 1 is implemented with sensors and pre-constructed optical flow fields.

FIG. 16 illustrates an exemplary embodiment of an imaging system 300, wherein the first motion of the mobile platform 110 and the status of the imaging device 111 can be utilized to construct a corresponding optical flow field. The imaging system 300 can comprise one or more first sensors for the first motion of mobile platform 110 and one or more second sensors for the status of imaging device 116. At least one of the first and second sensors can be associated with a processor 280 as illustrated in FIG. 16. As shown and described above with reference to FIGS. 3 and 4, the first rotation sensor 251 measures a rotation of the platform 110 about the first axis 131. The first rotation sensor 251 can be an Inertial Measurement Unit ("IMU"). Alternatively and/or additionally, the first movement sensor 252 and the second movement sensor 253 of the first motion can be implemented via the same IMU or be implemented via other velocity devices.

Each of the first sensors 251-253 can provide the processor 280 with measurements of the first motions of the mobile platform 110 that can be used as bases for selecting a pre-categorized optical flow field 111. In exemplary embodiments, the measurements of the first motions can be combined with measurements of at least one of a second sensor for the imaging device 116, including a position sensor 310 and a second motion sensor 320.

Although shown and described as associating the first sensors 251-253 for the first motion of the mobile platform 110 and the second sensors 310, 320 of the imaging device 116 for purposes of illustration only, other suitable motions and status measurements can also be associated with the processor 280 for selecting an optical flow field. Stated somewhat differently, the processor 280 can be associated with a plurality of suitable sensors that can include at least one of the first and second sensors for the first motion of the mobile platform 110 and the status of the imaging device 116.

As shown in FIG. 16, the processor 280 can be associated with a memory 290. Examples of the memory 290 can include a random access memory ("RAM"), static RAM, dynamic RAM, read-only memory ("ROM"), programmable ROM, erasable programmable ROM, electrically erasable programmable ROM, flash memory, secure digital ("SD") card, and the like. The memory 290 can be used to store preloaded data, including, but not limited to, pre-categorized scenarios and corresponding optical flow fields 111. The processor 280 can determine a scenario based on the first motion of the mobile platform 110 acquired via the first sensors for the first motion and the second sensors for status of the imaging device 116. In an exemplary embodiment, the processor 280 can select a corresponding optical flow field when the scenario matches one of the pre-categorized scenarios.

The processor 280 can comprise any commercially available graphic chip that chips can be used in currently available video equipment. For example, the processor 280 can be a custom-designed graphic chips specially produced for the imaging device 111. The processor 280 can comprise, or be configured to communicate with, one or more additional chips for accelerating rendering of 2D (or 3D) scenes or other graphics, MPEG-2/MPEG-4 decoding, TV output, or an ability to connect multiple displays. Additionally and/or alternatively, the processor 280 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

The processor 280 can be operably connected to the first sensors for the first motion of the mobile platform 110 and the second sensors for the status of the imaging device 116 for determining the scenario and selecting the corresponding optical flow field 111. The connection among the processor 280 and the first and second sensors can be a wired and/or wireless link. The processor 280 can be configured to perform any of the methods 200 described herein, including but not limited to, a variety of operations relating to image processing. In some embodiments, the processor 280 can include specialized hardware for processing specific operations relating to the image processing.

In some other embodiments, the memory 290 can be used to store a software product that is programed to perform any of the methods described herein, including but not limited to, a variety of operations relating to image processing.

Figure 17:
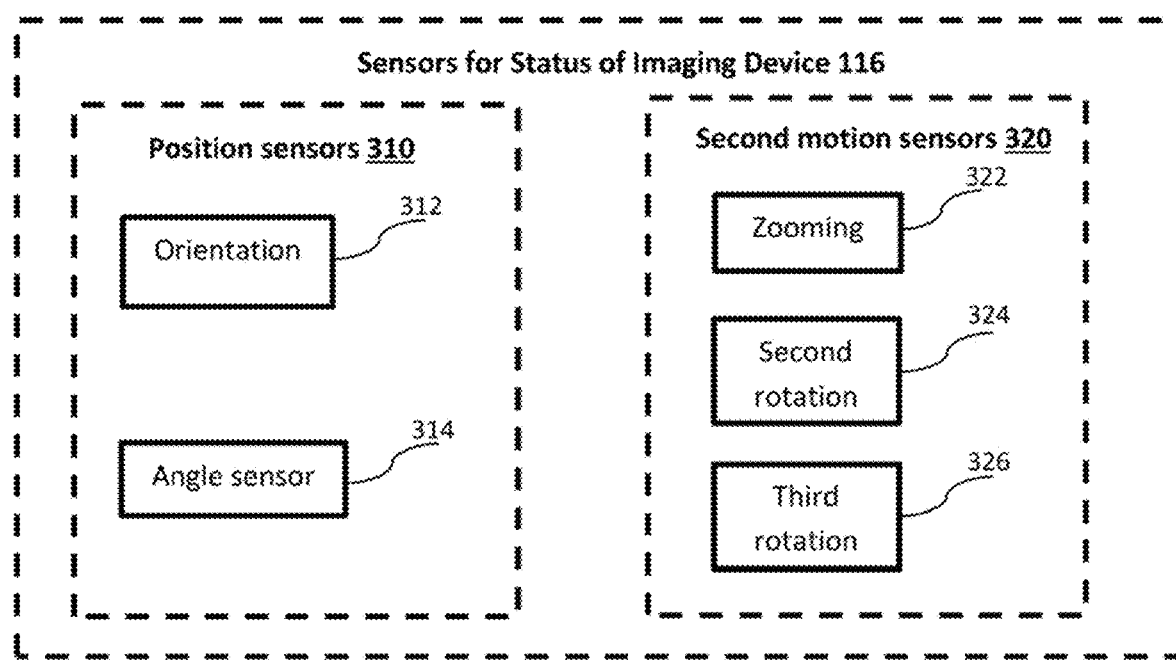
FIG. 17 is an exemplary block diagram illustrating an alternative embodiment of the system of FIG. 16 wherein the system includes an imaging device and sensors for detecting a status of the imaging device.

FIG. 17 shows an exemplary embodiment of the system 300, wherein the second sensors for status of the imaging device 116 (shown in FIG. 2) is shown as including position sensors 310 and second motion sensors 320 of the imaging device 116. In FIG. 17, the position sensors 310 of the imaging device 116 can include an orientation sensor 312 for measuring the horizontal orientation of the imaging device 116 and an angle sensor 314 to detect the tilt angle (collectively shown in FIG. 4) of the imaging device 116. The orientation sensor 312 and the angle sensor 314 can be at least one sensor associated with a gimbal 117 (shown in FIG. 2).

Although shown and described as having an orientation sensor 312 and an angle sensor 314 for purposes of illustration only, other suitable sensors can be employed to detect the position 310 of the imaging device 116.

The second motion sensors 320 of the imaging device 116 can include a zooming sensor 322, a second rotation sensor 324 and a third rotation sensor 326. The zooming sensor 322 can comprise at least one sensor associated with the imaging device 116 for detecting a zooming-in motion and/or a zooming-out motion. The second rotation sensor 324 and the third rotation sensor 326 can comprise one or more motion sensors associated with the gimbal 117 to detect a horizontal rotation and a vertical rotation of the imaging device 116.

Although shown and described as having the zooming sensor 322 and the rotation sensors 324, 326 for purposes of illustration only, other suitable sensors can be employed to detect the second motion 320 of the imaging device 116.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for constructing an optical flow field, comprising:
   classifying a plurality of scenarios according to motions of a mobile platform carrying an imaging device and statuses of the imaging device, the plurality of scenarios comprising at least one of elementary scenarios or combined scenarios;
   constructing a plurality of optical flow fields each corresponding to one of the plurality of scenarios;
   acquiring, by different motion sensors, a motion of the mobile platform and a status of the imaging device relative to the mobile platform; and
   selecting a corresponding optical flow field from the constructed optical flow fields corresponding to the plurality of scenarios based upon the motion of the mobile platform and the status of the imaging device for the imaging device to capture a frame at a shooting direction.

2. The method of claim 1, wherein one combined scenario is generated by combining two or more of the elementary scenarios.

3. The method of claim 2, wherein constructing the plurality of optical flow fields each corresponding to one of the plurality of scenarios comprises constructing a plurality of optical flow fields each corresponding to one of the elementary scenarios.

4. The method of claim 3, wherein constructing the plurality of optical flow fields each corresponding to one of the plurality of scenarios further comprises applying vector operations on the optical flow fields corresponding to the two or more of the elementary scenarios to construct an optical flow field corresponding to the one combined scenario.

5. The method of claim 4, wherein applying the vector operations on the optical flow fields corresponding to the two or more of the elementary scenarios includes applying the vector operations against a combination of the optical flow fields corresponding to the two or more of the elementary scenarios.

6. The method of claim 5, wherein applying the vector operations includes applying vector superposition.

7. The method of claim 1, wherein vectors representing pixel movements of the frame are consistent throughout the frame.

8. The method of claim 7, wherein the vectors are identical or similar in magnitude and at least some of the vectors are different in direction.

9. The method of claim 1, wherein acquiring the motion comprises determining at least one of a rotation of the mobile platform, a first movement of the mobile platform in a horizontal direction, or a second movement of the mobile platform in a vertical direction.

10. The method of claim 9, wherein acquiring the status of the imaging device comprises determining at least one of a zooming of the imaging device, a first rotation of the imaging device in a horizontal direction, a second rotation of the imaging device in a vertical direction, an orientation of the imaging device, or a tilt angle of the imaging device.

11. The method of claim 1, wherein constructing the optical flow field corresponding to the elementary scenario comprises associating a pre-categorized optical flow field with the elementary scenario of at least one of the motion of the mobile platform or the status of the imaging device.

12. The method of claim 11, wherein:
associating the pre-categorized optical flow field with the elementary scenario comprises associating a rotating view with the elementary scenario,
the rotating view comprises a predetermined view in which a motion at an outer portion of the frame is significantly faster than a motion at an inner portion of the frame, and
the elementary scenario comprises the imaging device shooting in a direction that is orthogonal to a horizontal plane while the mobile platform is rotating in a plane that is parallel to the horizontal plane.

13. The method of claim 11, wherein:
associating the pre-categorized optical flow field with the elementary scenario comprises associating a side moving view with the elementary scenario,
the side moving view comprises a predetermined view in which all objects of the frame are moving along curve paths, and
the elementary scenario comprises the imaging device shooting in a direction parallel to a horizontal plane while the mobile platform or the imaging device is rotating in a plane parallel to the horizontal plane.

14. The method of claim 11, wherein:
associating the pre-categorized optical flow field with the elementary scenario comprises associating a zooming-in view with the elementary scenario,
the zooming-in view comprises a predetermined view in which points away from a center of the frame are moving faster than points in the center and getting out of the frame, and
the elementary scenario comprises the imaging device shooting in a direction that is orthogonal to a horizontal plane while zooming in or while the mobile platform is moving toward a ground.

15. The method of claim 11, wherein:
associating the pre-categorized optical flow field with the elementary scenario comprises associating a zooming-out view with the elementary scenario,
the zooming-out view comprises a predetermined view in which points away from a center of the frame are moving faster than points in the center and getting into the frame, and
the elementary scenario comprises the imaging device shooting in a direction that is orthogonal to a horizontal plane while zooming out or while the mobile platform is moving away from a ground.

16. The method of claim 11, wherein:
associating the pre-categorized optical flow field with the elementary scenario comprises associating a straight moving view with the elementary scenario,
the straight moving view comprises a predetermined view in which the motion is global for all pixels within the frame, the pixels at an upper portion of the frame are moving slower than the pixels of near-by objects at a lower portion of the frame, and
the elementary scenario comprises the imaging device shooting at a shooting direction with a certain angle to a horizontal plane while the mobile platform is moving at a certain speed in the shooting direction.

17. The method of claim 11, wherein:
associating the pre-categorized optical flow field with the elementary scenario comprises associating a global motion view with the elementary view,
the global motion view comprises a predetermined view in which the imaging device moves at ultra-fast global constant speed, and
the elementary scenario comprises the mobile platform holding still while the imaging device is rotating in a plane perpendicular to a horizontal plane.

18. The method of claim 1, wherein constructing the optical flow field corresponding to the combined scenario comprises associating the optical flow field constructed by vector operations with the combined scenario.

19. An apparatus for constructing an optical flow field, comprising:
a memory that stores one or more computer-executable instructions; and
one or more processors configured to access the memory and execute the computer-executable instructions to perform a method comprising:
classifying a plurality of scenarios according to motions of a mobile platform carrying an imaging device and statuses of the imaging device, the plurality of scenarios comprising at least one of elementary scenarios or combined scenarios;
constructing a plurality of optical flow fields each corresponding to one of the plurality of scenarios;
acquiring, by different motion sensors, a motion of the mobile platform and a status of the imaging device relative to the mobile platform; and
selecting a corresponding optical flow field from the constructed optical flow fields corresponding to the plurality of scenarios based upon the motion of the mobile platform and the status of the imaging device for the imaging device to capture a frame at a shooting direction.

20. An unmanned aerial vehicle (UAV), comprising:
an imaging device;
a memory that stores one or more computer-executable instructions; and
one or more processors configured to access the memory and execute the computer-executable instructions to perform a method comprising:
classifying a plurality of scenarios according to motions of the UAV and statuses of the imaging device, wherein the plurality of scenarios comprising at least one of elementary scenarios or combined scenarios;
constructing a plurality of optical flow fields each corresponding to one of the plurality of scenarios;

acquiring, by different motion sensors, a motion of the UAV and a status of the imaging device relative to the UAV; and selecting a corresponding optical flow field from the constructed optical flow fields corresponding to the plurality of scenarios based upon the motion of the UAV and the status of the imaging device for the imaging device to capture a frame at a shooting direction.

* * * * *